United States Patent
Nelson et al.

(10) Patent No.: US 8,534,413 B2
(45) Date of Patent: Sep. 17, 2013

(54) PRIMARY CLUTCH ELECTRONIC CVT

(75) Inventors: Stephen L. Nelson, Osceola, MN (US);
Brian R. Gillingham, Osceola, MN (US); Urs Wenger, Rumisberg (CH);
Brian D. Krosschell, North Branch, MN (US); Beat Kohler, Kirchberg (CH);
Ronald Zurbruegg, Oppligen (CH);
Donald E. Frost, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/399,422

(22) Filed: Feb. 17, 2012

(65) Prior Publication Data
US 2013/0092468 A1    Apr. 18, 2013

Related U.S. Application Data

(60) Provisional application No. 61/547,485, filed on Oct. 14, 2011.

(51) Int. Cl.
*B60K 17/06* (2006.01)
*B60K 17/02* (2006.01)
*F16H 55/56* (2006.01)

(52) U.S. Cl.
USPC ............... 180/366; 474/8; 477/37; 477/39

(58) Field of Classification Search
USPC ............... 180/366, 364; 474/8, 11, 13, 18, 474/28; 477/37, 39, 44
See application file for complete search history.

(56) References Cited

U.S. PATENT DOCUMENTS

| | | | |
|---|---|---|---|
| 5,094,652 A * | 3/1992 | Sakakibara et al. | 474/8 |
| 6,182,784 B1 | 2/2001 | Pestotnik | |
| 6,257,081 B1 | 7/2001 | Gagnon | |
| 6,902,502 B2 * | 6/2005 | Murakami et al. | 474/23 |
| 7,367,420 B1 | 5/2008 | Sherrod et al. | |
| 7,641,588 B2 | 1/2010 | Thomson | |
| 7,688,557 B2 | 3/2010 | Ishioka | |
| 7,731,613 B2 | 6/2010 | Ishida | |
| 7,901,319 B2 | 3/2011 | Tabata | |
| 7,905,803 B2 | 3/2011 | Mochizuki | |
| 8,029,395 B2 * | 10/2011 | Hokari et al. | 474/28 |
| 2007/0026982 A1 | 2/2007 | Aoyama | |
| 2007/0207884 A1 | 9/2007 | Unno | |

(Continued)

FOREIGN PATENT DOCUMENTS

| | | |
|---|---|---|
| CN | 101382193 | 3/2009 |
| EP | 2131074 | 12/2009 |

OTHER PUBLICATIONS

Gangadurai et al.; Development of control strategy for optimal control of a continuously variable transmission operating in combination with a throttle controlled engine; SAE International; Oct. 12, 2005.

(Continued)

*Primary Examiner* — Drew Brown
(74) *Attorney, Agent, or Firm* — Faegre Baker Daniels LLP

(57) ABSTRACT

A continuously variable transmission (CVT) is provided for use on a recreational or utility vehicle. The CVT is electronically controlled by a control unit of the vehicle. The CVT includes a primary clutch having a first sheave and a second sheave moveable relative to the first sheave. An actuator may be positioned between the primary and secondary clutches.

39 Claims, 23 Drawing Sheets

(56) References Cited

U.S. PATENT DOCUMENTS

| | | |
|---|---|---|
| 2008/0103019 A1 | 5/2008 | Cronin |
| 2008/0108463 A1* | 5/2008 | Unno ............................ 474/29 |
| 2008/0178838 A1 | 7/2008 | Ota |
| 2008/0182713 A1 | 7/2008 | Asaoka |
| 2008/0183350 A1 | 7/2008 | Noguchi |
| 2008/0183357 A1 | 7/2008 | Asaoka |
| 2008/0183359 A1 | 7/2008 | Sawada |
| 2008/0194380 A1 | 8/2008 | Unno |
| 2008/0215217 A1 | 9/2008 | Unno |
| 2008/0287256 A1 | 11/2008 | Unno |
| 2009/0105039 A1* | 4/2009 | Sah et al. ............................ 477/5 |
| 2009/0291788 A1* | 11/2009 | Hokari et al. ..................... 474/28 |
| 2010/0152982 A1* | 6/2010 | Bowman et al. ................. 701/53 |
| 2011/0034279 A1 | 2/2011 | Yamaguchi |
| 2011/0059821 A1* | 3/2011 | Lee et al. ........................... 474/8 |
| 2011/0070991 A1* | 3/2011 | Wu et al. ........................... 475/5 |
| 2011/0152020 A1* | 6/2011 | Brind'Amour et al. ........... 474/8 |
| 2011/0306457 A1* | 12/2011 | Lee et al. ...................... 475/213 |
| 2012/0035019 A1* | 2/2012 | Martini et al. ................. 477/110 |
| 2012/0238384 A1* | 9/2012 | Lee et al. ......................... 474/25 |

OTHER PUBLICATIONS

Unno et al.; Development of Electronically Controlled DVT Focusing on Rider's Intention of Acceleration and Deceleration; SAE International; Oct. 30, 2007.

http://www.hilliardcorp.com/centrifugal-clutch.html, Motion Control Division, Centrifugal Clutches, accessed Jan. 8, 2013.

* cited by examiner

PRIMARY CLUTCH ELECTRONIC CVT

RELATED APPLICATIONS

This application claims the benefit of U.S. Provisional Patent Application No. 61/547,485, titled "Primary Clutch Electronic CVT," filed Oct. 14, 2011, the disclosure of which is expressly incorporated by reference herein.

FIELD OF THE DISCLOSURE

The present disclosure relates to electronically controlled transmissions, and more particularly to an electronically controlled continuously variable transmission (CVT) for recreational and utility vehicles.

BACKGROUND AND SUMMARY

Some recreational vehicles, such as all-terrain vehicles (ATV's), utility vehicles, motorcycles, etc., include a continuously variable transmission (CVT). In these vehicles, an actuator adjusts the position of one of the primary and secondary clutches of the CVT. The thrust requirement of the actuator for moving the clutch is generally dependent on the sliding friction between the movable sheave and the sliding coupling.

Available space is often limited around the CVT for placing the components of the actuator assembly. As such, actuator components having a large package size are often difficult to place in close proximity to the CVT. Further, the removal of some or all of the actuator components is often required when replacing the CVT belt.

A starting clutch is sometimes used to engage the CVT. The starting clutch is positioned at the driven or secondary clutch of the CVT to engage the secondary clutch when the CVT is in a low gear ratio condition. Due to the low speeds and high torques of the secondary clutch when the starting clutch engages the secondary clutch, the starting clutch is generally large in size.

In some recreational vehicles with CVT's, such as snowmobiles, the electrical system does not include a battery. As such, the rotational motion of the engine is used to generate power for the vehicle. In these vehicles, or in vehicles that experience a sudden power loss, the clutch assembly of the CVT may require a manual reset to a home position prior to starting the vehicle.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
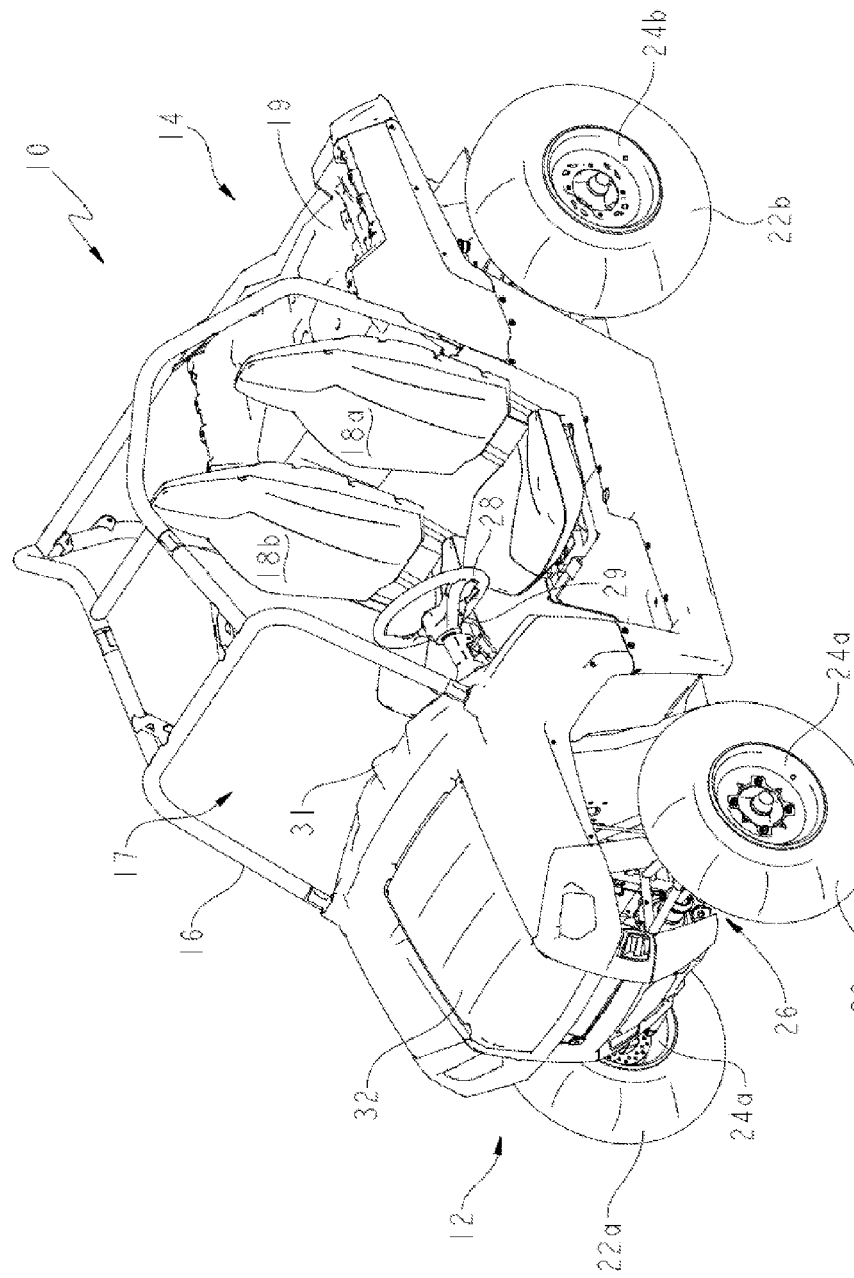
FIG. 1 is a perspective view of an exemplary vehicle incorporating the electronic CVT of the present disclosure.

Referring initially to FIG. 1, an exemplary vehicle 10 having an electronically controlled CVT is illustrated. Vehicle 10 is illustratively a side-by-side ATV 10 including a front end 12, a rear end 14, and a frame or chassis 15 that is supported above the ground surface by a pair of front tires 22a and wheels 24a and a pair of rear tires 22b and wheels 24b. ATV 10 includes a pair of laterally spaced-apart bucket seats 18a, 18b, although a bench style seat or any other style of seating structure may be used. Seats 18a, 18b are positioned within a cab 17 of ATV 10. A protective cage 16 extends over cab 17 to reduce the likelihood of injury to passengers of ATV 10 from passing branches or tree limbs and to act as a support in the event of a vehicle rollover. Cab 17 also includes front console 31, adjustable steering wheel 28, and shift lever 29. Front console 31 may include a tachometer, speedometer, or any other suitable instrument.

Front end 12 of ATV 10 includes a hood 32 and a front suspension assembly 26. Front suspension assembly 26 pivotally couples front wheels 24 to ATV 10. Rear end 14 of ATV 10 includes an engine cover 19 which extends over an engine and transmission assembly (see FIG. 2). Rear end 14 further includes a rear suspension assembly (not shown) pivotally coupling rear wheels 24 to ATV 10. Other suitable vehicles may be provided that incorporate the CVT of the present disclosure, such as a snowmobile, a straddle-seat vehicle, a utility vehicle, a motorcycle, and other recreational and non-recreational vehicles.

Figure 2:
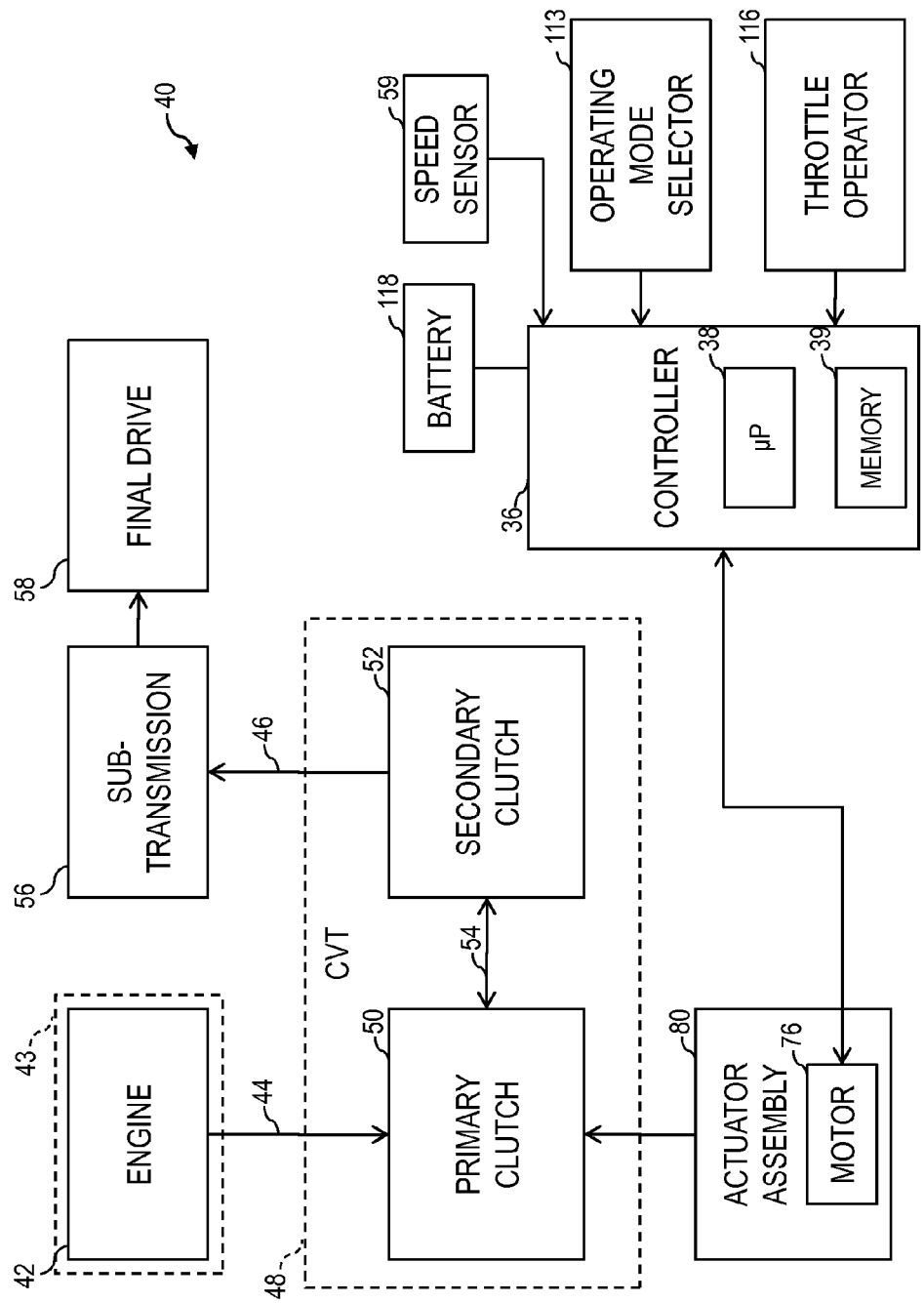
FIG. 2 is a perspective view of an exemplary drive system of the vehicle of FIG. 1 including a continuously variable transmission (CVT)

Referring to FIG. 2, an exemplary drive system 40 of vehicle 10 of FIG. 1 is illustrated including an engine 42 and a CVT 48. CVT 48 includes a primary or drive clutch 50 and a secondary or driven clutch 52. An endless, variable speed belt 54 is coupled to the primary and secondary clutches 50, 52. Engine 42 includes an engine case or housing 43 and an output shaft 44 configured to drive primary clutch 50 of the CVT 48. Rotation of primary clutch 50 is transferred to secondary clutch 52 via belt 54. An output shaft 46 of secondary clutch 52 is coupled to and drives a sub-transmission 56 which is coupled to the final drive 58 for driving wheels 24 (see FIG. 1). In one embodiment, sub-transmission 56 is geared to provide a high gear, a low gear, a reverse gear, and a park configuration for vehicle 10 of FIG. 1. Fewer or additional gears may be provided with sub-transmission 56.

An actuator assembly 80 is configured to control primary clutch 50, as described herein. Actuator assembly 80 includes a motor 76 controlled by a clutch controller 36. In one embodiment, motor 76 is an electrical stepper motor, although motor 76 may alternatively be a brushed motor or other suitable electrical or hydraulic motor. In an alternative embodiment, controller 36 and actuator assembly 80 control secondary clutch 52 of CVT 48. Controller 36 includes a processor 38 and a memory 39 accessible by processor 38 that contains software with instructions for controlling CVT 48. In one embodiment, controller 36 is part of an engine control unit (ECU) configured to control engine 42. In this embodiment, a throttle operator 116 including a position sensor is coupled to controller 36, and controller 36 electronically controls the throttle position of engine 42 based on the detected position of throttle operator 116. In one embodiment, controller 36 communicates with sensors/devices of vehicle 10 and/or other vehicle controllers via controller area network (CAN) communication.

In the illustrated embodiment, secondary clutch 52 is a mechanically controlled clutch 52 and includes a stationary sheave and a moveable sheave (not shown). Secondary clutch 52 is configured to control the tension of belt 54 of CVT 48 as primary clutch 50 is adjusted. In one embodiment, secondary clutch 52 includes a spring and a torque-sensing helix (not shown). The helix applies a clamping force on belt 54 proportional to the torque on secondary clutch 52. The spring applies a load proportional to the displacement of the moveable sheave. In one embodiment, secondary clutch 52 provides mechanical load feedback for CVT 48.

Figure 3A:
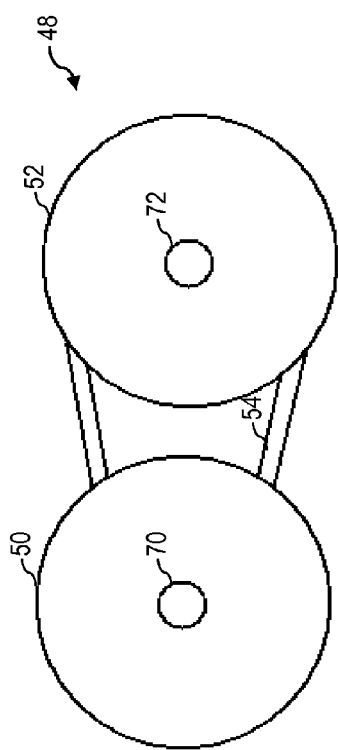
FIGS. 3a and 3b are diagrammatic views of the CVT of FIG. 2 according to one embodiment.
Figure 3B:
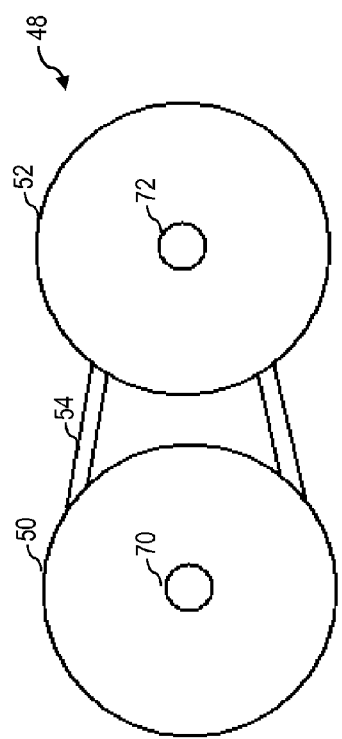

As illustrated in FIGS. 3A and 3B, primary clutch 50 is coupled to and rotates with a shaft 70, and secondary clutch 52 is coupled to and rotates with a shaft 72. Shaft 70 is driven by the output shaft 44 of engine 42 (see FIG. 2). Shaft 72 of secondary clutch 52 drives sub-transmission 56 (see FIG. 2). Belt 54 wraps around the primary and secondary clutches 50, 52 and transfers rotational motion of primary clutch 50 to secondary clutch 52.

Figure 4:
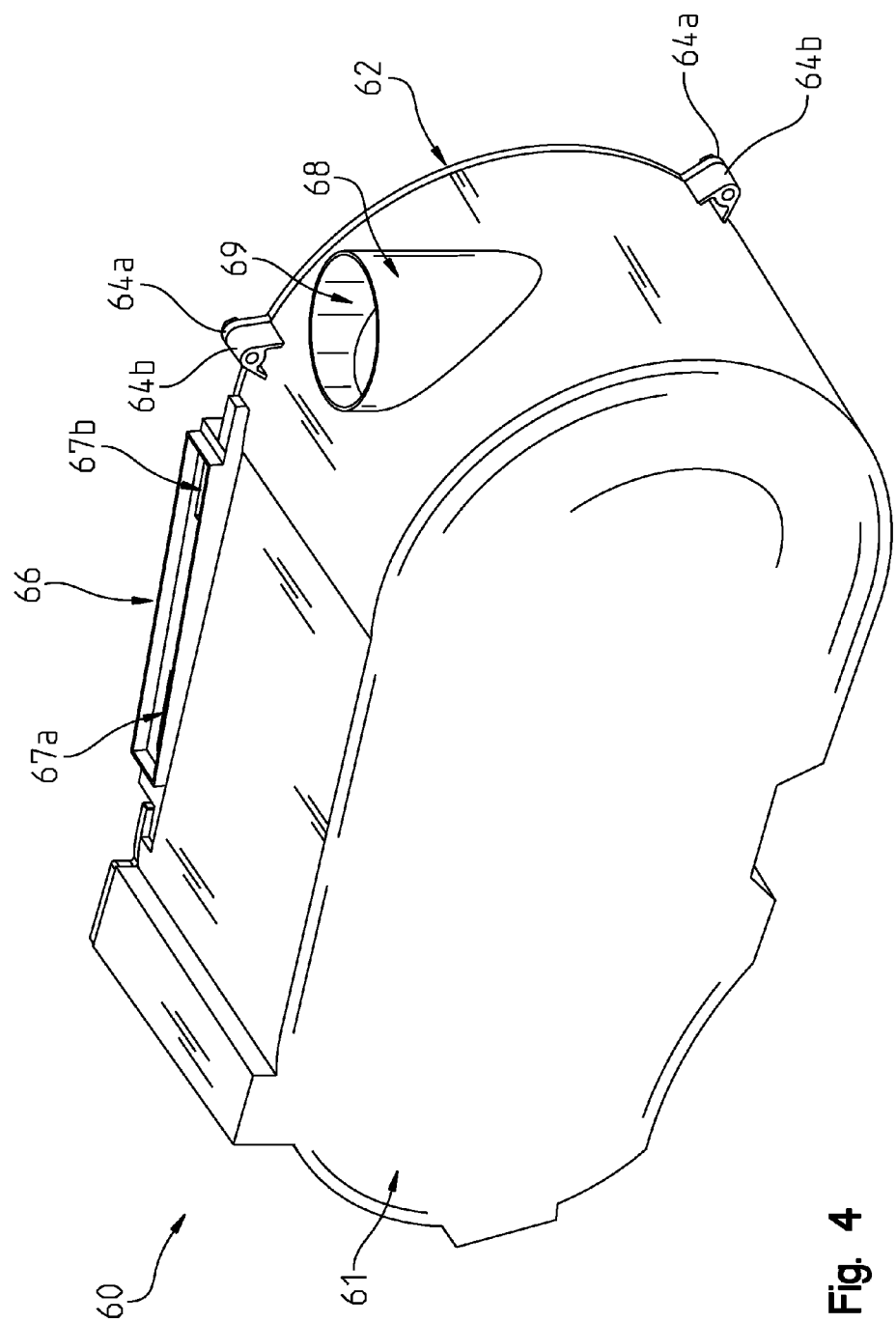
FIG. 4 is a front perspective view of an exemplary CVT of the vehicle of FIG. 1 according to one embodiment including a housing with a cover and a mounting bracket.
Figure 5:
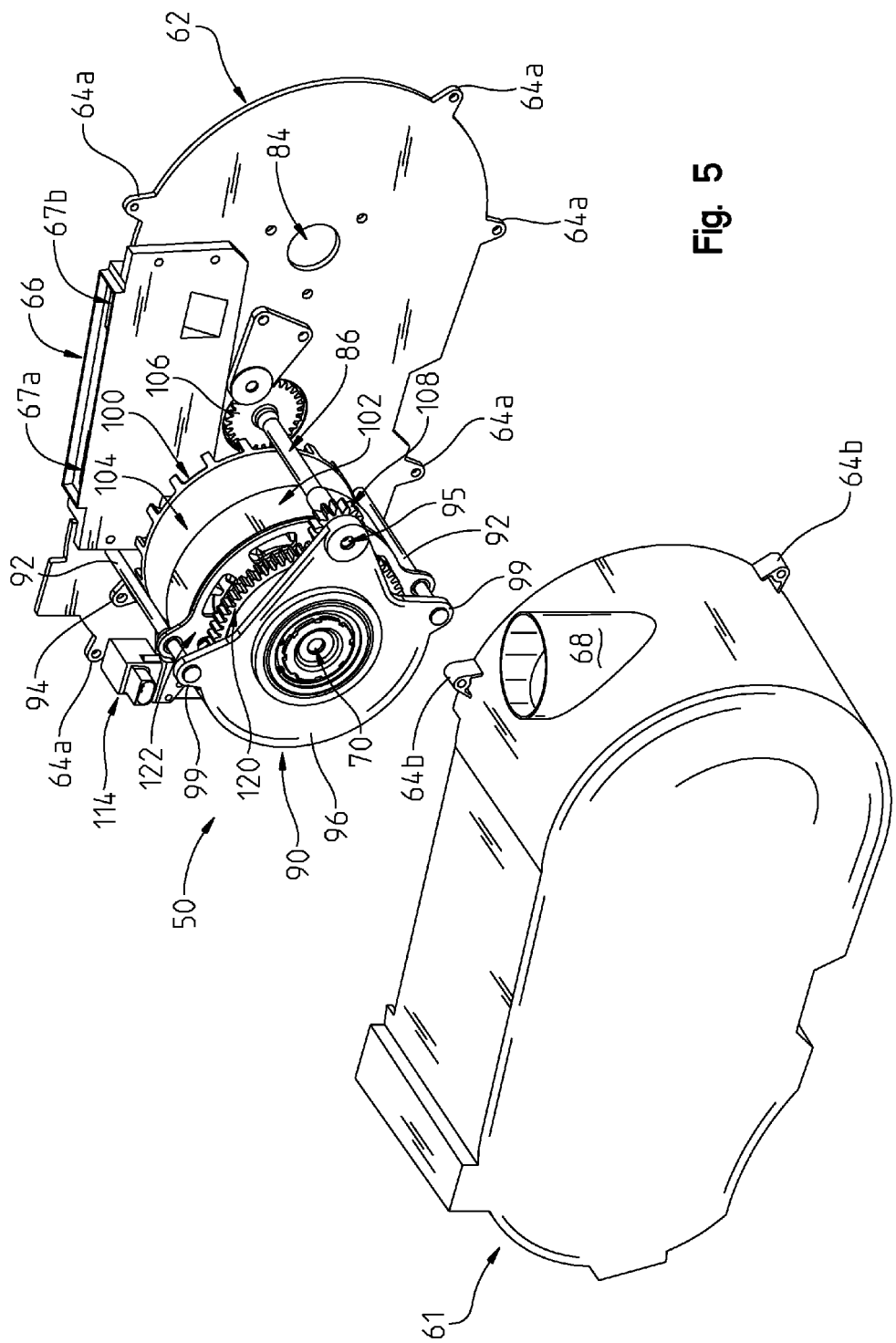
FIG. 5 is a front perspective view of the CVT of FIG. 4 with the cover removed from the mounting bracket.

Referring to FIG. 4, a housing 60 for CVT 48 is illustrated with a cover 61 coupled to a back plate or mounting bracket 62. Flanged portions 64a, 64b of mounting bracket 62 and cover 61, respectively, are illustratively configured to receive fasteners 74 (see FIG. 7) to couple cover 61 to mounting bracket 62. Fasteners 74 are illustratively bolts or screws, although other suitable fasteners 74 may be used. Cover 61 includes a pipe portion 68 forming an opening 69 to provide access to belt 54 of CVT 48. For example, opening 69 may be used to visually inspect belt 54 and/or secondary clutch 52 (see FIG. 2) or to check the tension of belt 54. Mounting bracket 62 includes a vent structure 66 including a pair of vents 67a, 67b extending into the interior of housing 60 (see FIG. 5). Vents 67a, 67b and opening 69 cooperate to provide airflow to CVT 48 to reduce the likelihood of the components of CVT 48 overheating. Vent structure 66 is illustratively coupled to mounting bracket 62 via fasteners 75 (see FIG. 7), although vent structure 66 may alternatively be integrally formed with mounting bracket 62 or cover 61. Cover 61 is removable from mounting bracket 62 upon removing fasteners 74 from flanged portions 64a, 64b. As illustrated in FIG. 5, cover 61 is adapted to be pulled away from mounting bracket 62 in a direction substantially perpendicular to the surface of mounting bracket 62.

Referring to FIG. 5, primary clutch 50 of CVT 48 is secured to mounting bracket 62 via a bracket 90. Bracket 90 includes flanged portions 94 each adapted to receive a fastener (not shown) to couple bracket 90 to mounting bracket 62. Bracket 90 illustratively includes an end wall 96 and a curved wall 98 (see FIG. 10) that extends perpendicularly between end wall 96 and mounting bracket 62. In the illustrated embodiment, curved wall 98 extends partially around the outer circumference of primary clutch 50. A pair of posts 92 further support bracket 90 between end wall 96 and mounting bracket 62. Posts 92 are illustratively press fit between flanged portions 99 of end wall 96 and mounting bracket 62, although posts 92 may alternatively be coupled to end wall 96 and/or mounting bracket 62 with fasteners. A position sensor 114 is coupled to a flange 115 (see FIG. 11) of bracket 90 for detecting the axial location of a moveable sheave 102 of primary clutch 50. In one embodiment, position sensor 114 is a rotary sensor with a bell crank, although a linear sensor or other suitable sensor may be provided. Sensor 114 provides position feedback to controller 36 (FIG. 2).

Figure 6:
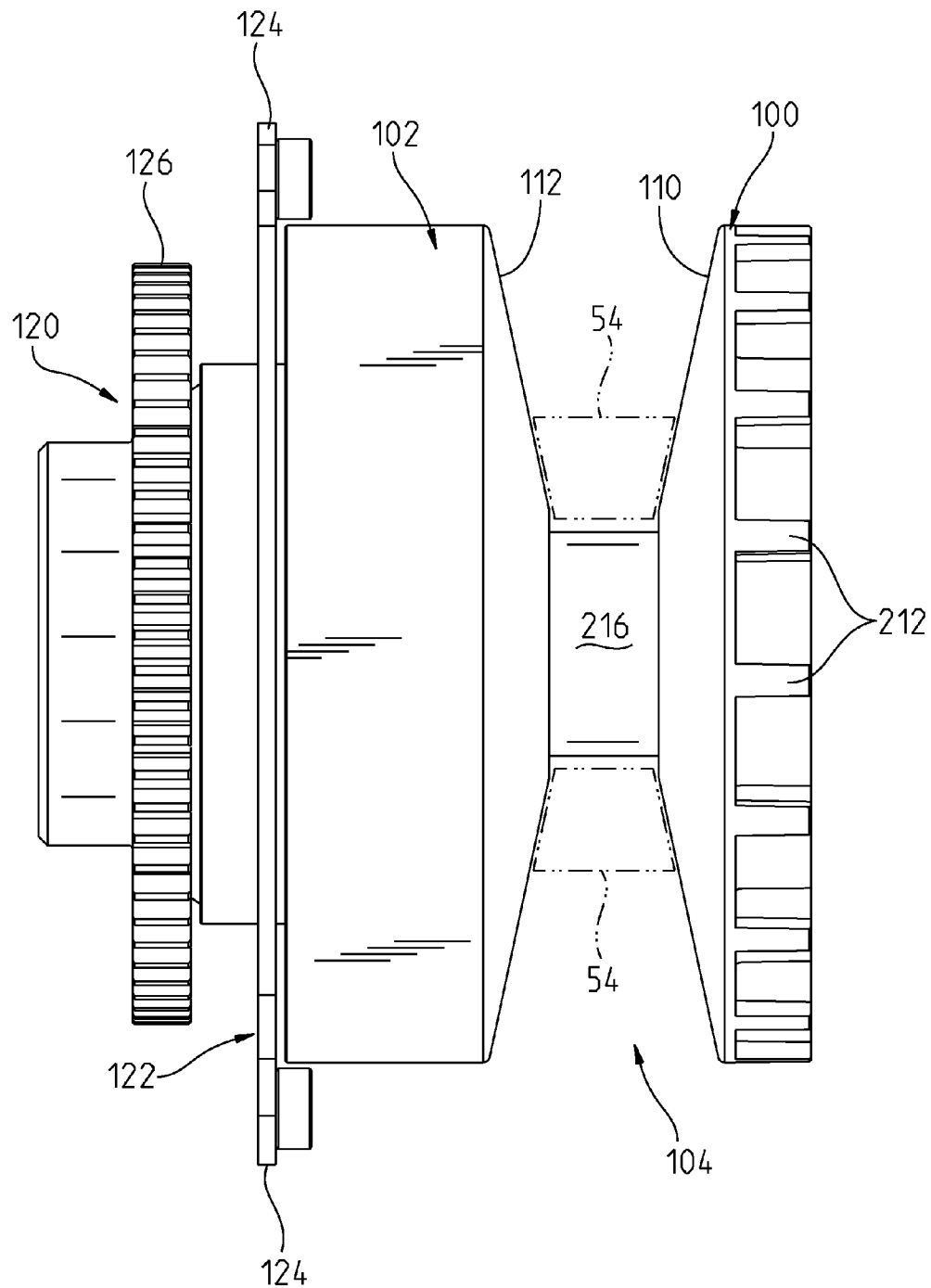
FIG. 6 is a side view of a primary clutch of the CVT of FIG. 4.

As illustrated in FIG. 5, primary clutch 50 includes a pair of sheaves 100, 102 that are supported by and rotate with shaft 70. Sheaves 100, 102 cooperate to define a pulley or slot 104 within which belt 54 (see FIG. 2) rides. As illustrated in FIG. 6, slot 104 is substantially V-shaped due to slanted inner surfaces 110, 112 of respective sheaves 100, 102. Accordingly, belt 54 has a substantially V-shaped cross-section to cooperate with inner surfaces 110, 112 of the sheaves 100, 102. Primary clutch 50 further includes a screw assembly including an outer screw assembly 120 and an inner screw assembly 122 positioned between outer screw assembly 120 and moveable sheave 102.

Figure 14:
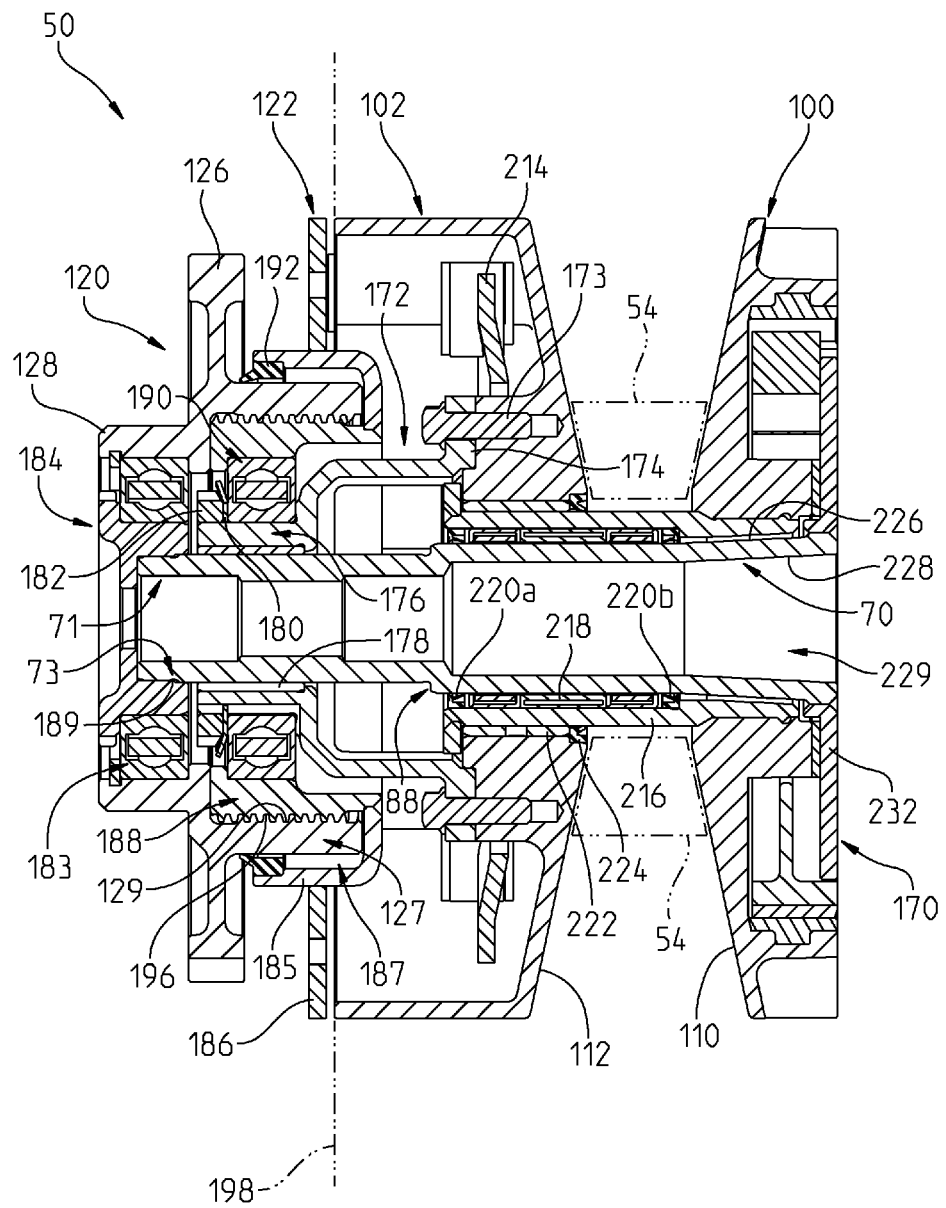
FIG. 14 is a cross-sectional view of the primary clutch of FIG. 6 taken along line 14-14 of FIG. 8.
Figure 15:
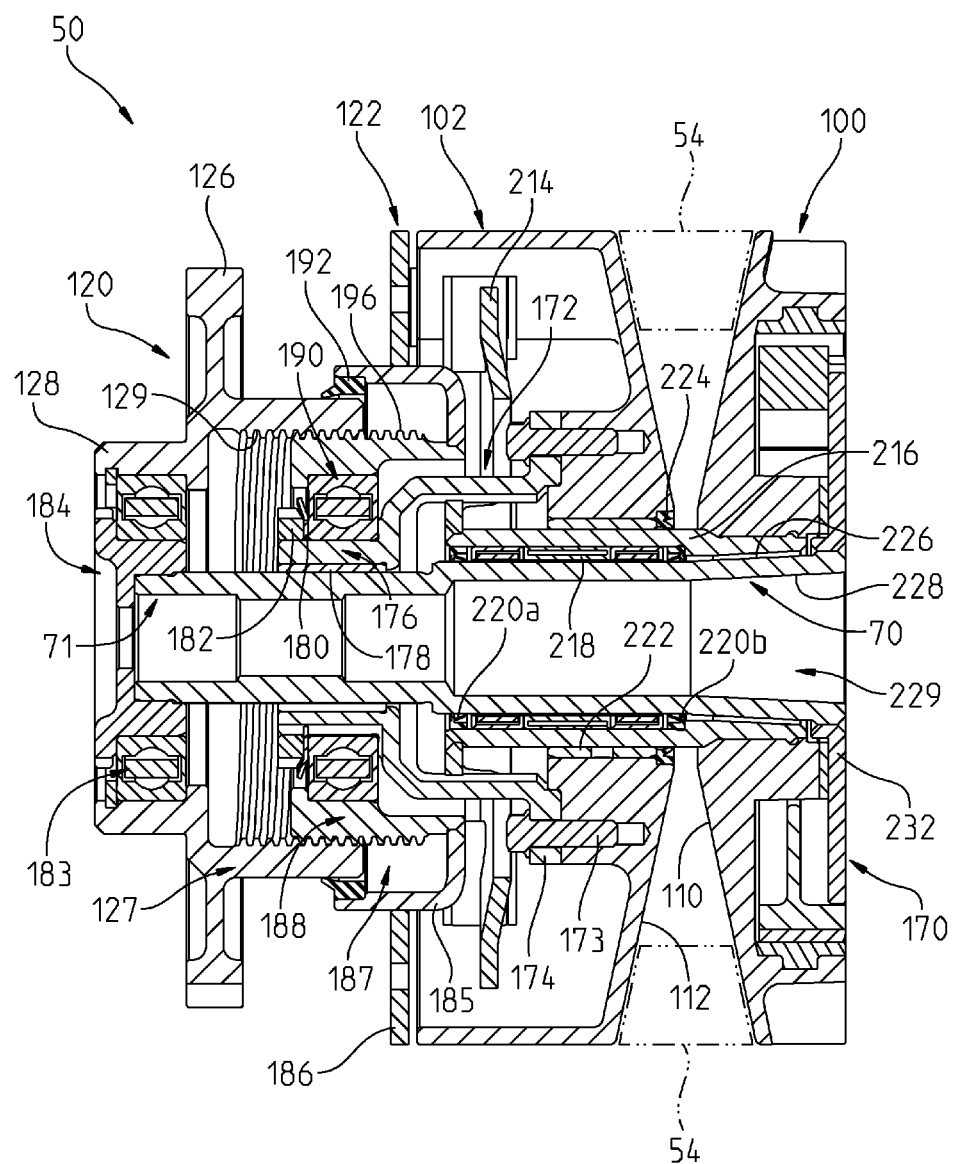
FIG. 15 is a cross-sectional view of the primary clutch of FIG. 6 taken along line 15-15 of FIG. 9.

In the illustrated embodiment, sheave 100 is stationary axially in a direction parallel to the axis of shaft 70, and sheave 102 is movable axially in a direction parallel to the axis of shaft 70. In particular, sheave 102 is configured to slide along shaft 70 to a plurality of positions between a fully extended or open position (see FIGS. 8 and 14) and a fully closed or retracted position (see FIGS. 9 and 15). With moveable sheave 102 in a fully extended or open position, slot 104 is at a maximum axial width, and belt 54 rides near the radial center of primary clutch 50, as illustrated in FIG. 14. In the illustrated embodiment, belt 54 does not contact a tube portion 216 of a sliding support 200 of primary clutch 50 when moveable sheave 102 is at the fully open position of FIG. 14. With moveable sheave 102 in a fully retracted or closed position, slot 104 is at a minimum axial width, and belt 54 rides near the outer periphery of primary clutch 50, as illustrated in FIG. 15. Secondary clutch 52 (see FIG. 2) is similarly configured with a pair of sheaves (not shown) supported by and rotatable with shaft 72. One sheave of secondary clutch 52 is axially movable, and the other sheave is axially stationary. In one embodiment, secondary clutch 52 is configured to control the tension of belt 54. For purposes of illustrating primary clutch 50, secondary clutch 52 and belt 54 are not shown in FIGS. 5, 8, and 9.

Movement of sheave 102 of primary clutch 50 and movement of the moveable sheave of secondary clutch 52 provides variable effective gear ratios of CVT 48. In one embodiment, CVT 48 is configured to provide an infinite number of effective gear ratios between minimum and maximum gear ratios based on the positions of the moveable sheaves of the clutches 50, 52. In the configuration illustrated in FIG. 3A, the moveable sheave 102 (see FIG. 6) of primary clutch 50 is substantially opened, and the moveable sheave (not shown) of secondary clutch 52 is substantially retracted. Accordingly, a low gear ratio is provided by CVT 48 in the configuration of FIG. 3A such that shaft 72 of secondary clutch 52 rotates slower than shaft 70 of primary clutch 50. Similarly, in the configuration illustrated in FIG. 3B, the moveable sheave 102 (see FIG. 6) of primary clutch 50 is substantially retracted, and the moveable sheave (not shown) of secondary clutch 52 is substantially opened. Accordingly, a high gear ratio is provided by CVT 48 in the configuration of FIG. 3B such that shaft 72 of secondary clutch 52 rotates faster than shaft 70 of primary clutch 50.

Figure 7:
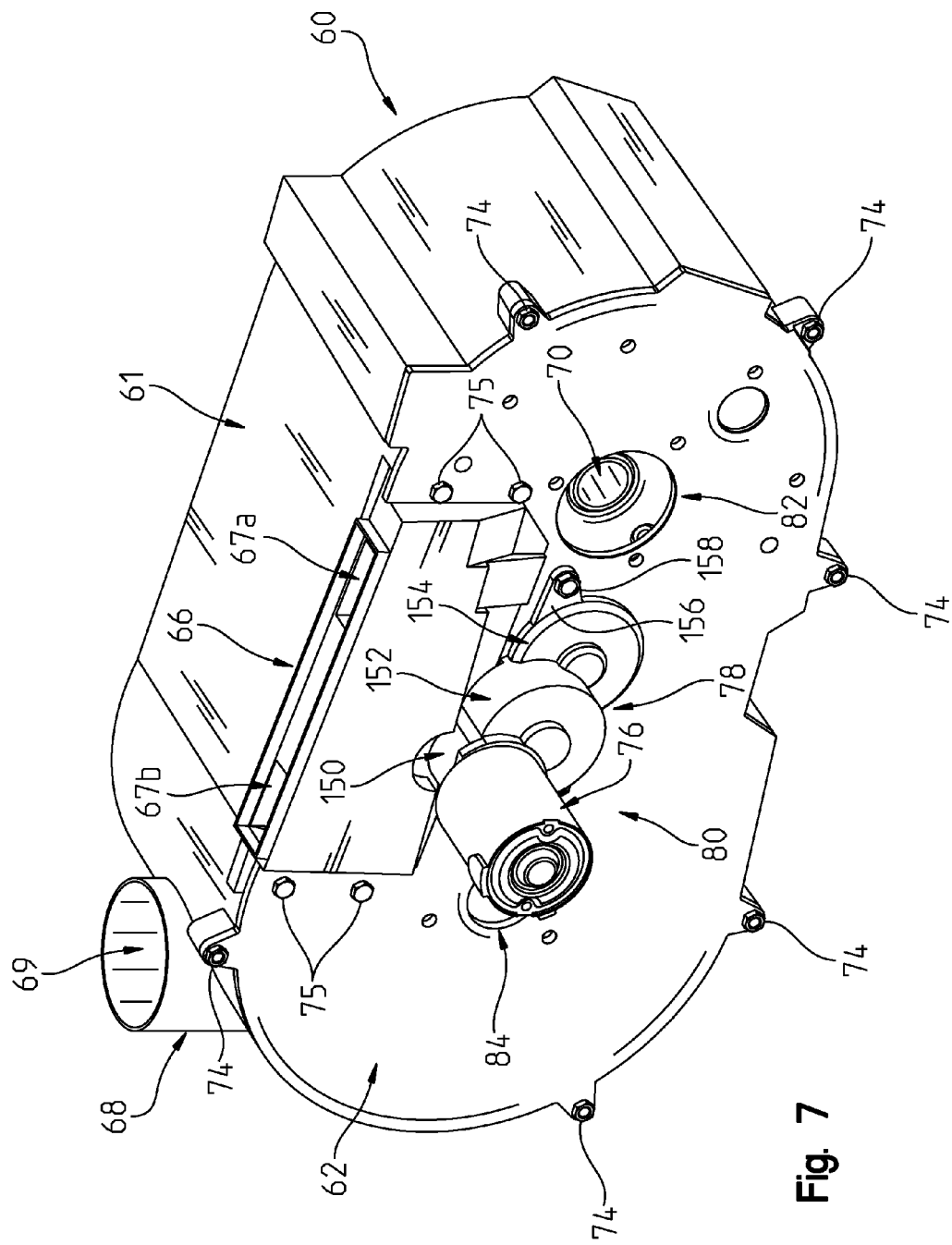
FIG. 7 is a rear perspective view of the CVT of FIG. 4 illustrating an actuator assembly.

As illustrated in FIG. 7, actuator assembly 80 is coupled to the back of mounting bracket 62. Actuator assembly 80 is configured to move the moveable sheave 102 (see FIG. 5) of primary clutch 50, as described herein. In the illustrative embodiment, engine 42 and sub-transmission 56 (see FIG. 2) are configured to be positioned adjacent the back of mounting bracket 62 on either side of actuator assembly 80. In particular, engine 42 is positioned to the right of actuator assembly 80 (as viewed from FIG. 7), and the output of engine 42 couples to shaft 70 of primary clutch 50 through an opening 82 of mounting bracket 62. Similarly, sub-transmission 56 is positioned to the left of actuator assembly 80 (as viewed from FIG. 7), and shaft 72 of secondary clutch 52 (see FIG. 3A) extends through an opening 84 of mounting bracket 62 to drive sub-transmission 56.

Figure 10:
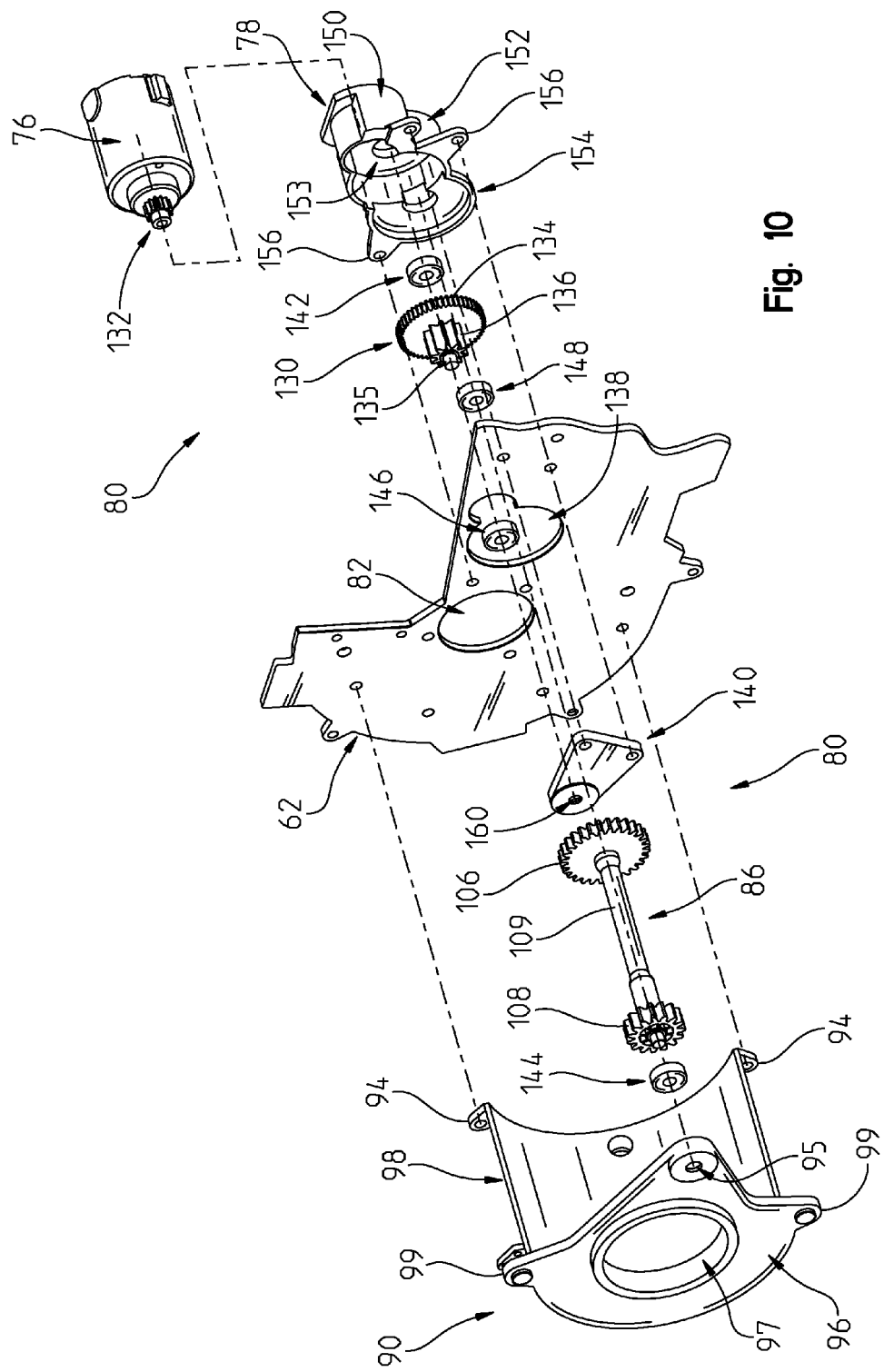
FIG. 10 is an exploded front perspective view of the actuator assembly of FIG. 7 with the mounting bracket partially cut away.
Figure 11:
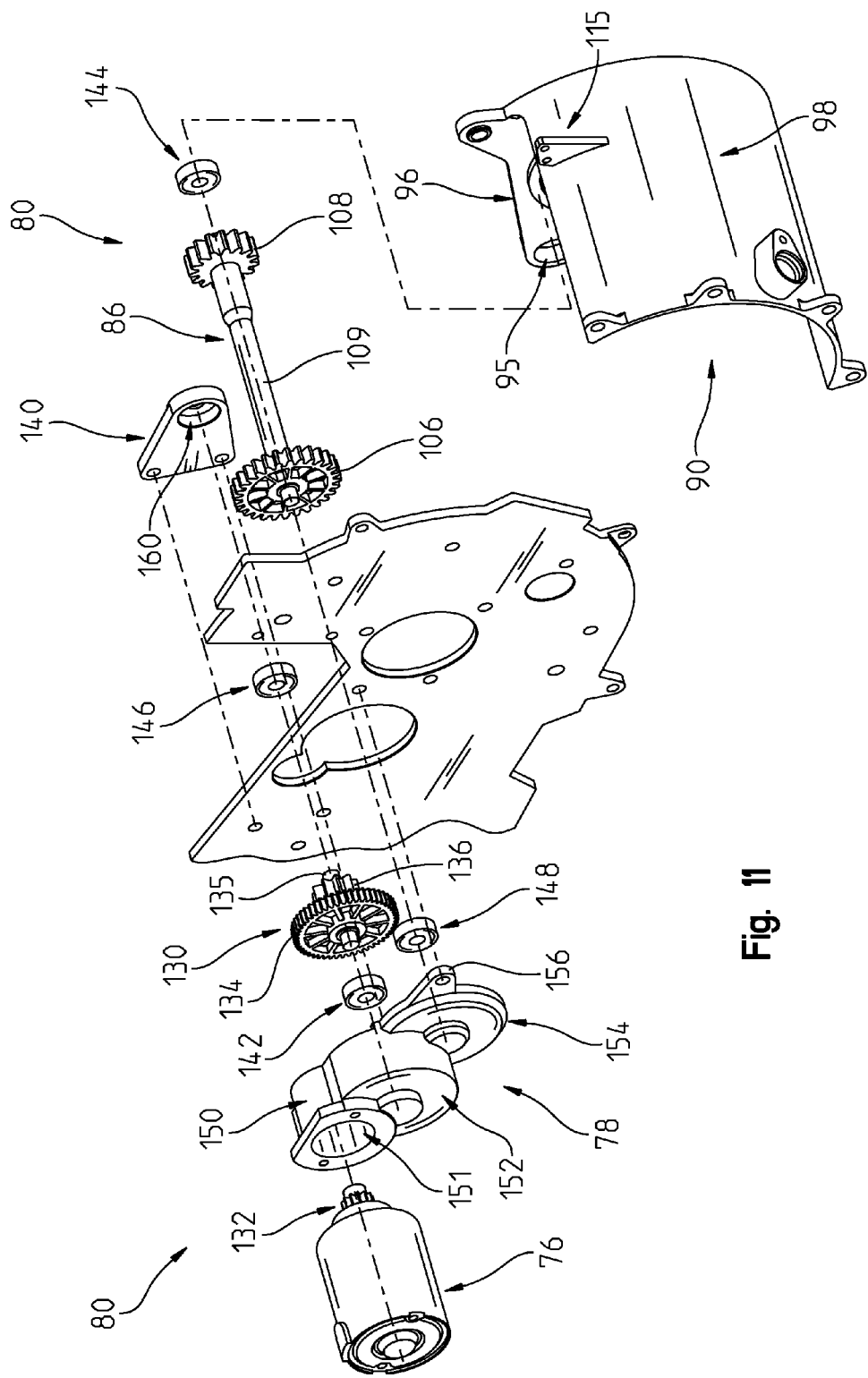
FIG. 11 is an exploded rear perspective view of the actuator assembly of FIG. 7 with the mounting bracket partially cut away.

As illustrated in FIGS. 10 and 11, actuator assembly 80 includes motor 76 with a geared output shaft 132, a reduction gear 130 housed within a gear housing 78, and a main gear drive 86 extending outwardly from the front of mounting bracket 62. Reduction gear 130 includes first and second gears 134, 136 coupled to a shaft 135. First gear 134 engages geared output shaft 132 of motor 76, and second gear 136 engages a first gear 106 coupled to an end of a shaft 109 of main gear drive 86. Main gear drive 86 further includes a second gear 108 coupled to an end of shaft 109 opposite first gear 106. Second gear 108 engages an outer gear 126 of screw assembly 120 (see FIG. 6) of primary clutch 50.

Gear housing 78 includes flange portions 156 each configured to receive a fastener 158 (see FIG. 7) for coupling gear housing 78 to the back of mounting bracket 62. Gear housing 78 includes a first portion 150, a second or intermediate portion 152, and a third portion 154. First portion 150 includes an opening 151 (see FIG. 11) that receives output shaft 132 of motor 76. Second portion 152 includes an opening 153 (see FIG. 10) that receives reduction gear 130. Reduction gear 130 is supported at one end by second portion 152 and at the other end by a support member 140 mounted on the front face of mounting bracket 62. Bearings 142, 146 are positioned at opposite ends of shaft 135 to facilitate rotation of reduction gear 130 within second portion 152 and support member 140, respectively. Third portion 154 of housing 78 houses a portion of first gear 106 and supports the end of shaft 109 adjacent first gear 106. Similarly, end wall 96 of bracket 90 supports the other end of shaft 109 adjacent second gear 108. As illustrated in FIG. 11, bearings 144, 148 are coupled at opposite ends of shaft 109 to facilitate rotation of main gear drive 86 relative to gear housing 78 and bracket 90. In particular, bearing 148 is received within third portion 154 of gear housing 78, and bearing 144 is received within an opening 95 formed in end wall 96 of bracket 90.

Referring to FIGS. 12-16, outer screw assembly 120 of primary clutch 50 includes a neck portion 128 and a threaded screw portion 127. Neck portion 128 extends through an opening 97 formed in end wall 96 of bracket 90 (see FIG. 10). An outer bearing support 184 is rotatably coupled to neck portion 128 via bearing assembly 183 and is fixedly coupled to an end 71 of shaft 70. As such, shaft 70 and outer bearing support 184 rotate together independently from outer screw assembly 120. In the illustrated embodiment, end 71 of shaft 70 is press fit into outer bearing support 184. End 71 further includes a circumferential channel 73 that engages an inner ridge 189 of outer bearing support 184 (see FIG. 14). End 71 of shaft 70 may also be fastened to outer bearing support 184 with an adhesive or other suitable fastener.

Inner screw assembly 122 includes a plate portion 186 and a threaded screw portion 188 positioned radially inwardly from plate portion 186. An L-shaped wall 185 is illustratively coupled between plate portion 186 and screw portion 188 forming a radial gap 187 between screw portion 188 and wall 185. Screw portion 188 includes outer threads 196 that mate with inner threads 129 of screw portion 127 of outer screw assembly 120. Screw portion 127 of outer screw assembly 120 is received within gap 187 formed in inner screw assembly 122 (see FIGS. 14-16). An o-ring seal 192 positioned radially inside of wall 185 is configured to abut screw portion 127 of outer screw assembly 120. Plate portion 186 of inner screw assembly 122 includes flanges 124 having apertures 125 (see FIGS. 12 and 13) that slidably receive posts 92 of bracket 90 (see FIGS. 8 and 9). Plate portion 186 further includes slots 194 circumferentially spaced near the outer perimeter of plate portion 186.

Still referring to FIGS. 12-16, a sliding assembly of primary clutch 50 includes a bushing assembly 172, a sliding support 200, and a bearing assembly 190 positioned between bushing assembly 172 and inner screw assembly 122. Bushing assembly 172 of primary clutch 50 includes a neck portion 176 that receives shaft 70 therethrough and a plurality of flanges 174 that couple to circumferentially spaced seats 202 of moveable sheave 102. A plurality of fasteners 173, illustratively screws 173, are received by corresponding apertures of flanges 174 and seats 202 to couple bushing assembly 172 to sheave 102. A bushing 178 positioned within neck portion 176 engages shaft 70 and supports the outboard end of moveable sheave 102. Shaft 70 is configured to rotate inside of bushing 178 at engine idle (when primary clutch 50 is disengaged) and to rotate with bushing 178 when primary clutch 50 is engaged. Bushing 178 is configured to provide a low-friction surface that slides along shaft 70 during movement of sheave 102. Bushing 178 may alternatively be a needle bearing.

Neck portion 176 of bushing assembly 172 is rotatably coupled to screw portion 188 of inner screw assembly 122 via bearing assembly 190 positioned within screw portion 188. A collar 182 and a toothed lock washer 180 are coupled to neck portion 176 extending through screw portion 188 (see FIGS. 14-16). Lock washer 180 illustratively includes an inner tab 181 (see FIG. 12) that engages a corresponding slot 177 (see FIG. 12) in the outer surface of neck portion 176 such that lock washer 180 rotates with bushing assembly 172. Collar 182 is threaded onto neck portion 176 and is rotatably fixed in place on neck portion 176 with tabbed lock washer 180. Accordingly, bushing assembly 172, sheaves 100, 102, collar 182, washer 180, and outer bearing support 184 are configured to rotate with shaft 70, while outer screw assembly 120 and inner screw assembly 122 do not rotate with shaft 70. Bushing assembly 172 is configured to slide axially along shaft 70 via bearing 178.

Figure 16:
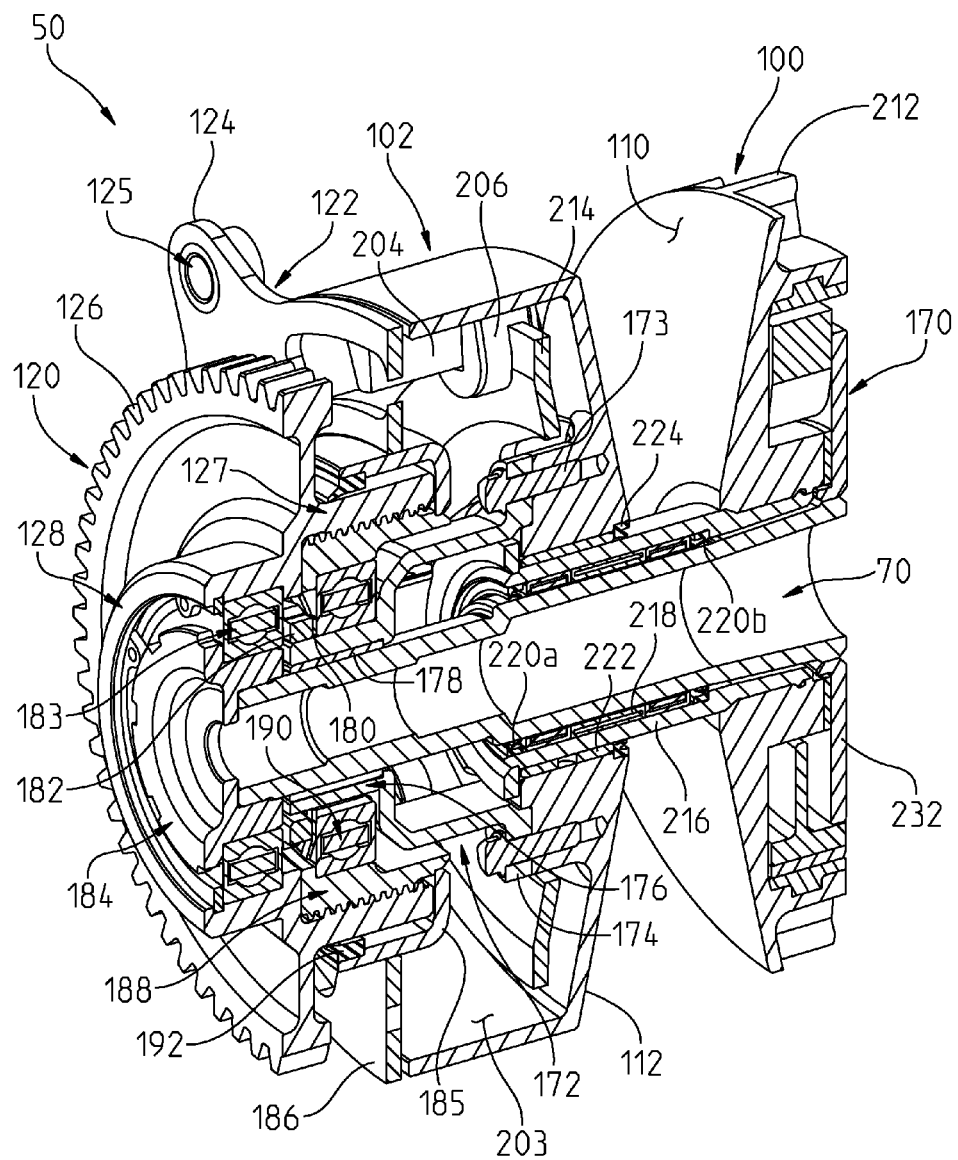
FIG. 16 is a perspective view of the primary clutch of FIG. 14 illustrating the cross-section taken along line 14-14 of FIG. 8.

Sliding support 200 is coupled to sheaves 100, 102 to provide a sliding interface for moveable sheave 102 relative to stationary sheave 100. As illustrated in FIGS. 14-16, sliding support 200 includes a tube portion 216 and a plate portion 214 coupled to and substantially perpendicular to tube portion 216. In one embodiment, plate portion 214 and tube portion 216 are molded together, although plate and tube portions 214, 216 may be coupled together with a fastener or by other suitable coupling means. Plate and tube portions 214, 216 each rotate with sheaves 100, 102 and shaft 70. A pair of seals 220*a*, 220*b* and a clutch 218 positioned between seals 220*a*, 220*b* are coupled between tube portion 216 and shaft 70. Clutch 218 is illustratively a one-way clutch 218 that free-wheels during vehicle idle and that locks tube portion 216 to shaft 70 during engine braking. As such, one-way clutch 218 acts as a bearing between tube portion 216 and shaft 70 during idling conditions and locks tube portion 216 to shaft 70 when CVT 48 is being driven faster than engine 42 (i.e., when belt 54 and clutch 50 work to overdrive engine 42 of FIG. 2).

Figure 12:
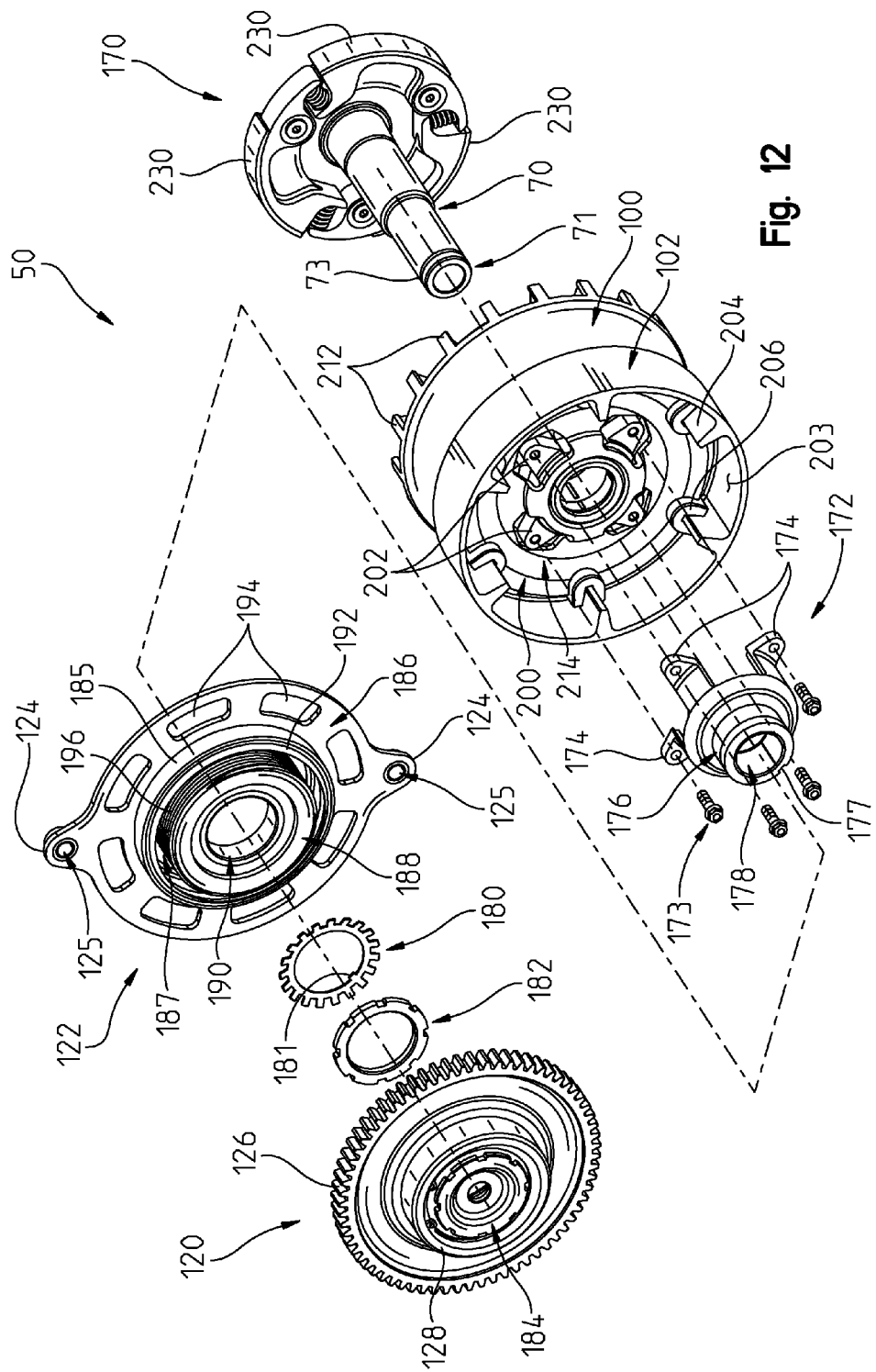
FIG. 12 is an exploded front perspective view of the primary clutch of FIG. 6 and a launch clutch.
Figure 13:
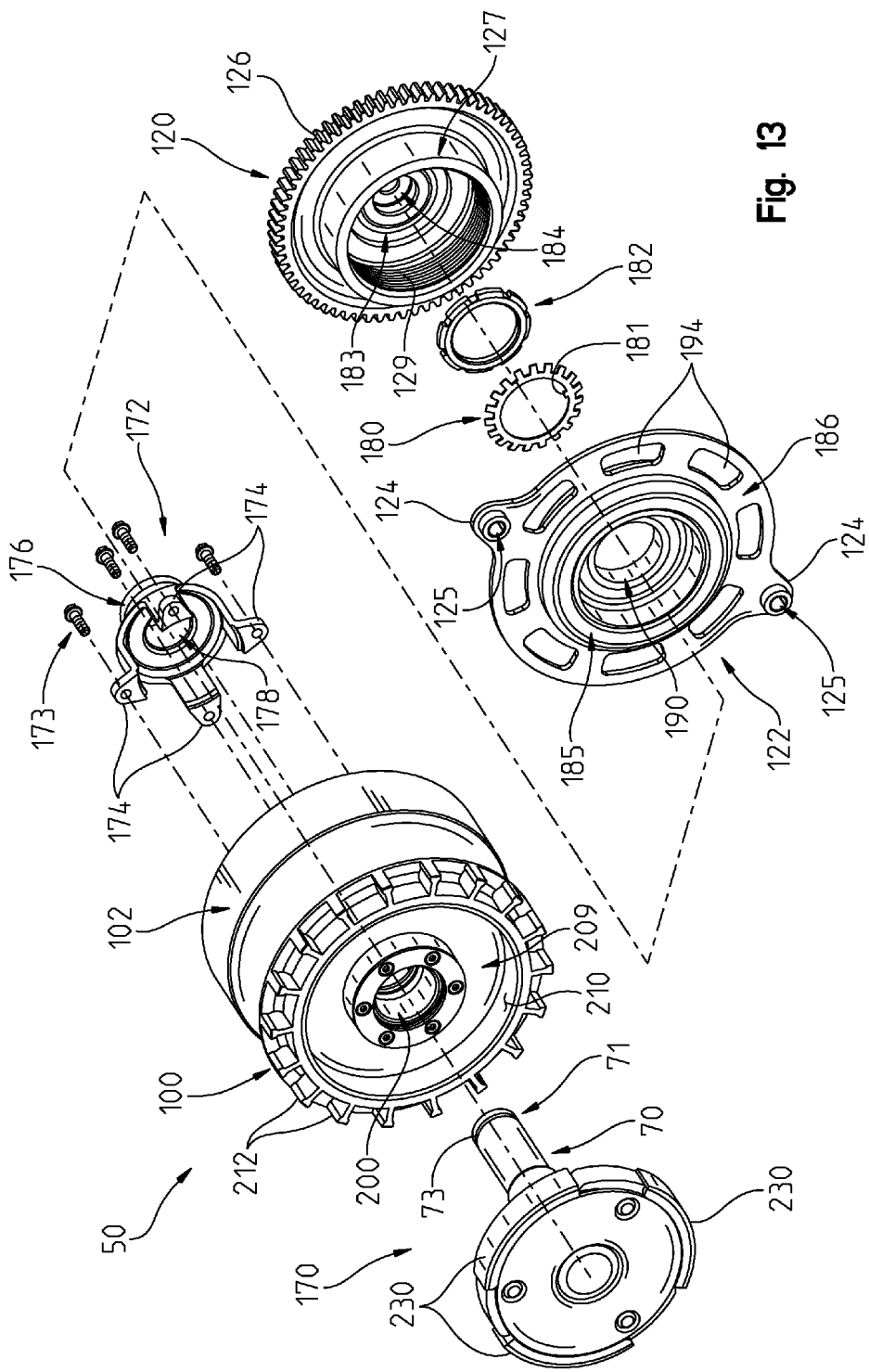
FIG. 13 is an exploded rear perspective view of the primary clutch of FIG. 6 and the launch clutch of FIG. 12.
Figure 17:
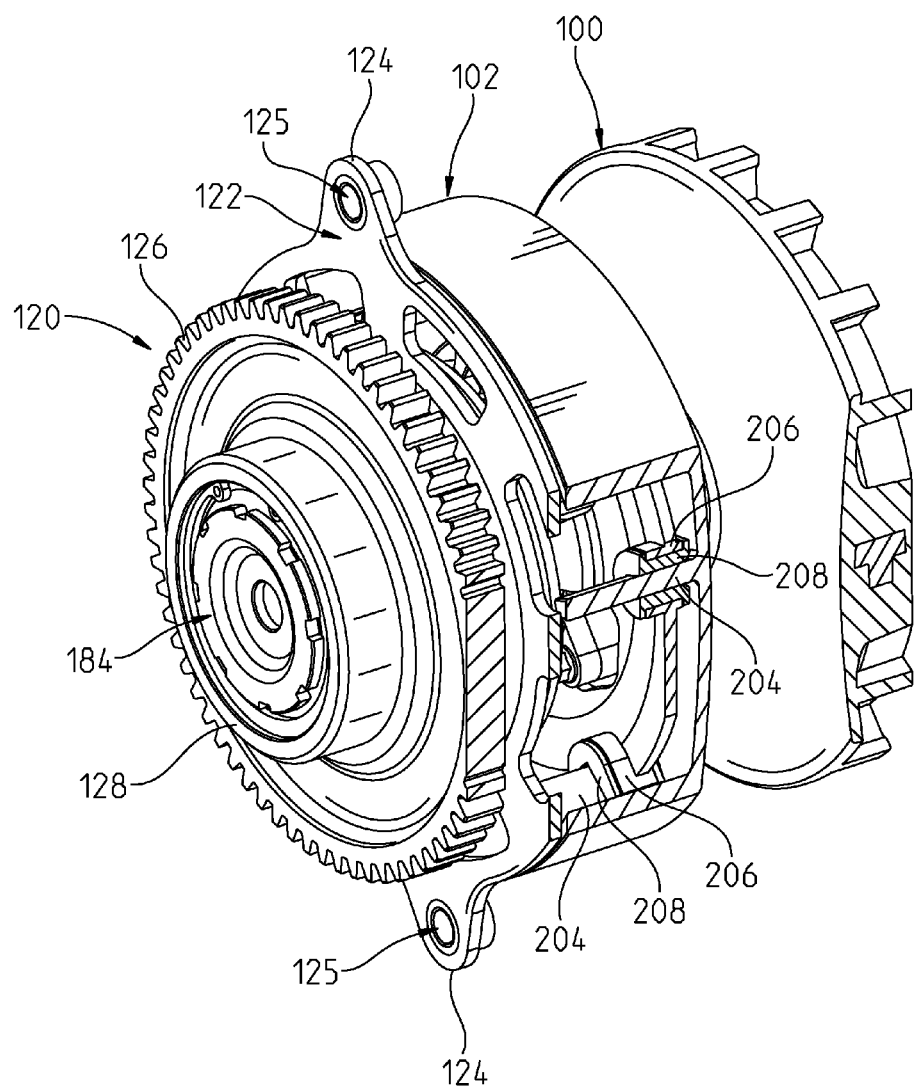
FIG. 17 is a perspective view of the primary clutch of FIG. 6 partially cut away illustrating a sliding interface of the moveable sheave.

As illustrated in FIG. 12, plate portion 214 includes a plurality of sliding couplers 206 that are circumferentially spaced around the outer diameter of plate portion 214. In the illustrated embodiment, the outer diameter of plate portion 214 is nearly the same as the outer diameter of moveable sheave 102 such that couplers 206 of plate portion 214 are immediately adjacent an inner cylindrical wall 203 of sheave 102. Couplers 206 are illustratively clips 206 that are configured to slidingly receive corresponding sliding members or ridges 204 that are circumferentially spaced around inner wall 203 of moveable sheave 102. Ridges 204 extend radially inward from and substantially perpendicular to cylindrical inner wall 203. Ridges 204 illustratively include a radial width and a radial height that is substantially greater than the radial width. As illustrated in FIG. 17, a low-friction liner 208 is positioned in each clip 206 to engage the sliding surface of ridges 204. In one embodiment, liner 208 is a low-friction composite or plastic material, such as polyether ether ketone (PEEK), polyimide-based plastic (e.g. Vespel), or nylon, for example, with additives to reduce friction. As illustrated in FIGS. 14-16, a cylindrical bearing or bushing 222 and an o-ring seal 224 are positioned between moveable sheave 102 and tube portion 216 to locate sheave 102 radially onto tube portion 216. Bushing 222 provides a low friction sliding surface for sheave 102 relative to tube portion 216. In one embodiment, grease is provided in the interfaces between ridges 204 and clips 206 and between bushing 222 and tube portion 216 to reduce sliding friction.

Moveable sheave 102 is configured to slide relative to sliding support 200 along ridges 204 of FIG. 12. In one embodiment, the sliding friction between sheave 102 and sliding support 200 is minimized with the sliding interface between couplers 206 and ridges 204 being near the outer diameter of moveable sheave 102. In the illustrated embodiment, the outer diameter of moveable sheave 102 is large relative to the outer diameters of shaft 70 and tube portion 216. In one embodiment, the outer diameter of moveable sheave 102 is at least three times greater than the outer diameters of shaft 70 and tube portion 216.

As illustrated in FIGS. 14-16, bearing assemblies 183 and 190 are each positioned outside of the outer profile of moveable sheave 102. In particular, referring to FIG. 14, bearing assemblies 183, 190 are positioned axially outside of the end of sheave 102 lying in plane 198. As such, bearing assemblies 183, 190 are axially spaced apart from the sliding interfaces formed with couplers 206 and ridges 204 and with bushing 222 and tube portion 216. In one embodiment, bearing assemblies 183, 190 include angular contact bearings, although other suitable bearings may be used. Neck portion 176 of bushing assembly 172 is also illustratively positioned outside of the outer profile of moveable sheave 102, as illustrated in FIG. 14.

Figure 8:
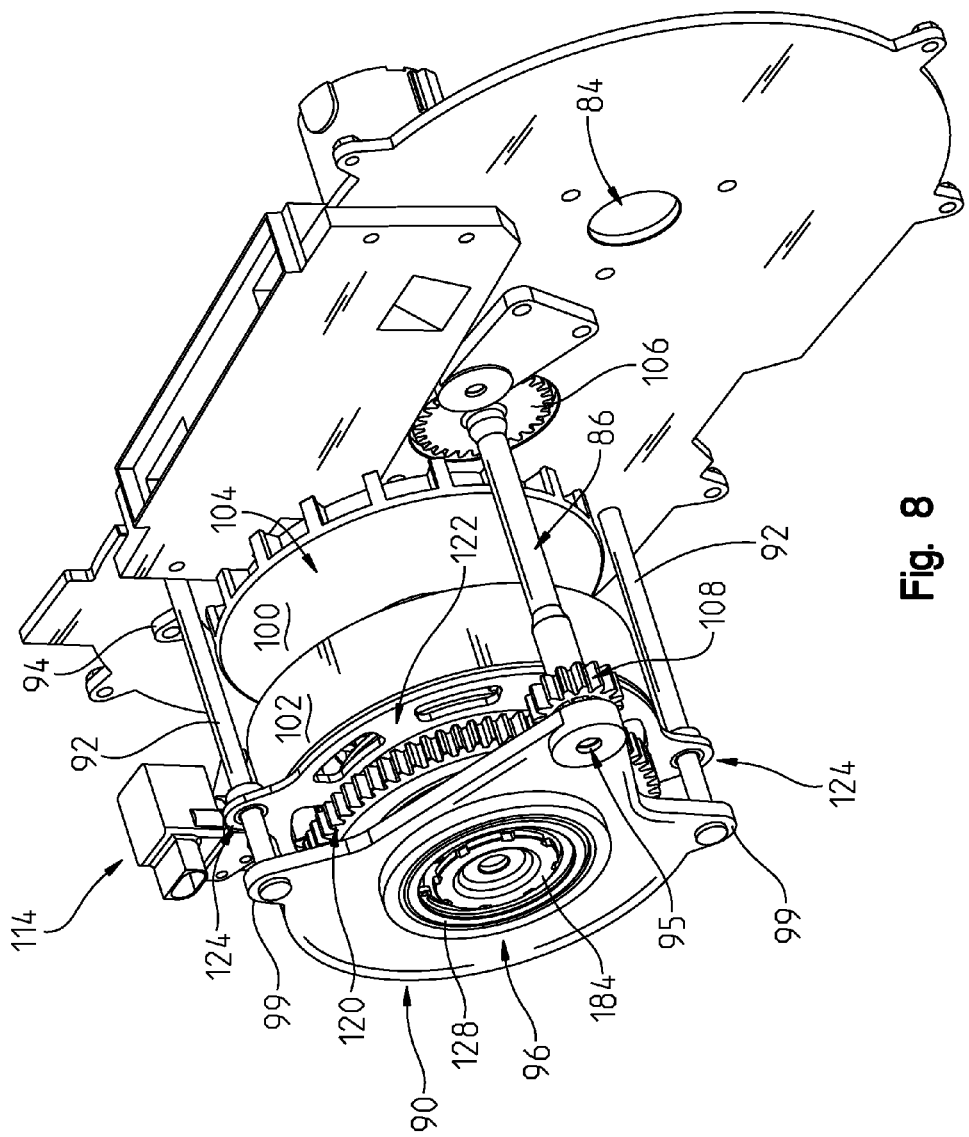
FIG. 8 is a front perspective view of the CVT of FIG. 4 illustrating a moveable sheave of the primary clutch in an open position.
Figure 9:
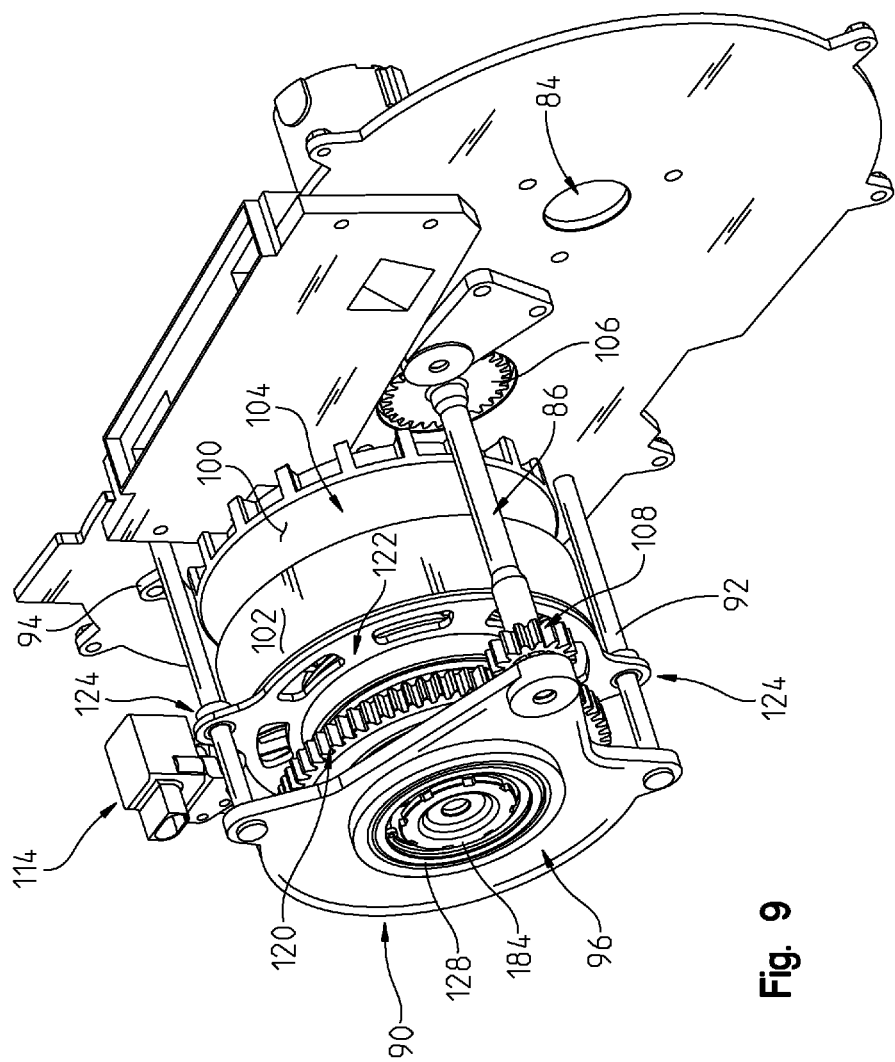
FIG. 9 is a front perspective view of the CVT of FIG. 4 illustrating the moveable sheave of the primary clutch in a closed position.

In operation, the actuation of gear drive 86 by motor 76 (see FIG. 10) is configured to modulate the gear ratio provided by primary clutch 50. Referring to FIG. 10, the output of motor 76 is transferred through reduction gear 130 to main gear drive 86 to thereby rotate outer screw assembly 120 (see FIG. 8) of primary clutch 50. Outer screw assembly 120 is stationary axially and rotates due to the rotation of main gear drive 86 independent of a rotation of shaft 70. Referring to FIGS. 8 and 14, rotation of outer screw assembly 120 in a first direction unscrews threaded screw portion 188 of inner screw assembly 122 from threaded screw portion 127 of outer screw assembly 120, thereby causing inner screw assembly 122 to slide axially along posts 92 towards stationary sheave 100 while remaining rotationally stationary.

Referring to FIG. 14, the axial movement of inner screw assembly 122 provides a thrust force against moveable sheave 102 via bushing assembly 172 to move sheave 102 towards stationary sheave 100. As described herein, bushing assembly 172 rotates within the rotationally stationary inner screw assembly 122 via bearing assembly 190. As such, the thrust force provided by inner screw assembly 122 is applied to bushing assembly 172 through bearing assembly 190. Similarly, rotation of outer screw assembly 120 in a second, opposite direction causes inner screw assembly 122 to move axially away from stationary sheave 100 along posts 92 (see FIG. 8) and to apply a pulling force on bushing assembly 172 and moveable sheave 102 through bearing assembly 190. Bearing assemblies 183, 190 provide axial movement of inner screw assembly 122, bushing assembly 172, and sheave 102 relative to shaft 70 that is independent from the rotational movement of shaft 70, sheaves 100, 102, sliding support 200, and bushing assembly 172. In the illustrated embodiment, the range of axial motion of inner screw assembly 122 relative to outer screw assembly 120 defines the maximum and minimum gear ratios provided with primary clutch 50, although other limit stops may be provided.

Figure 18:
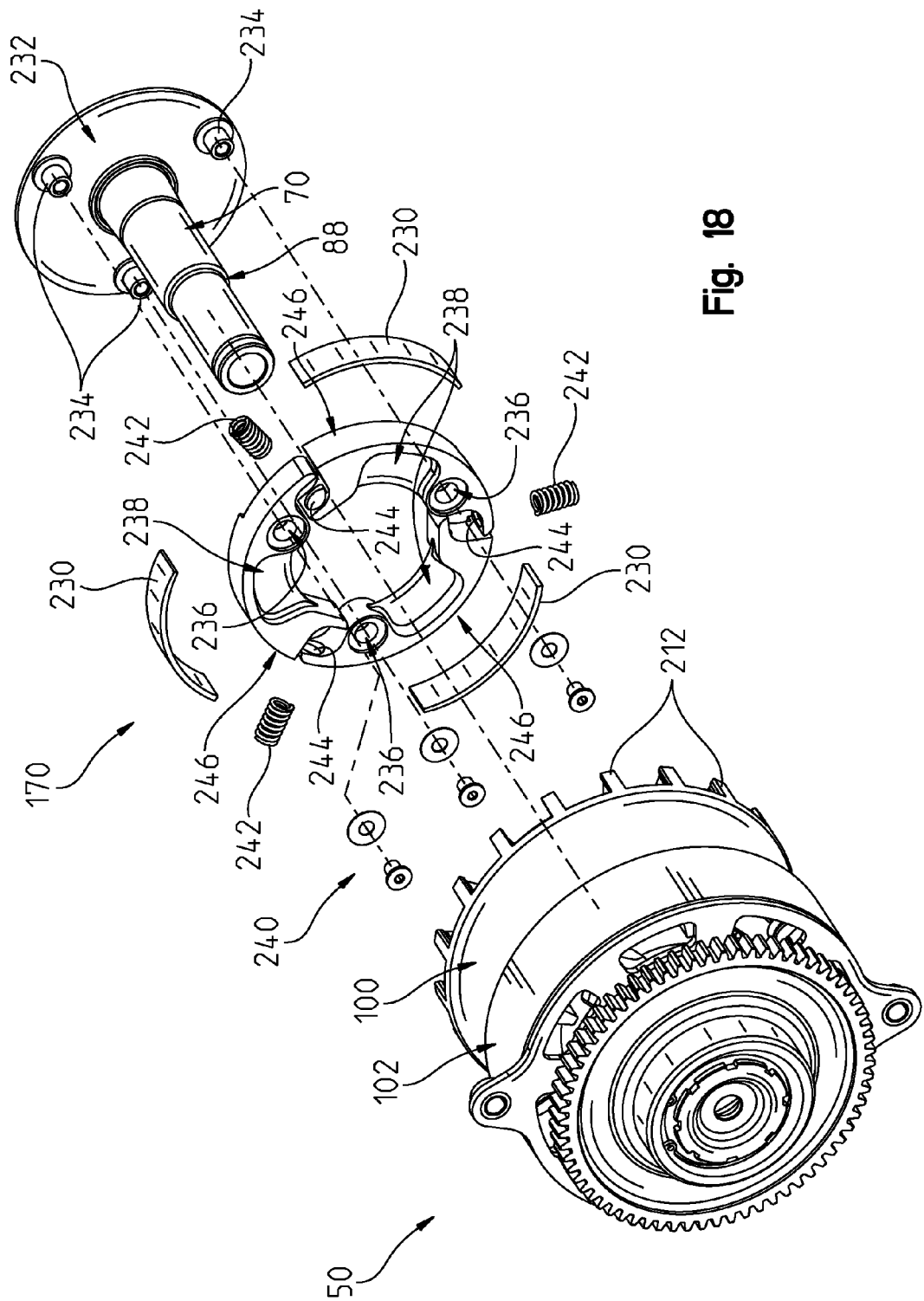
FIG. 18 is a partially exploded front perspective view of the primary clutch and the launch clutch of FIG. 12.
Figure 19:
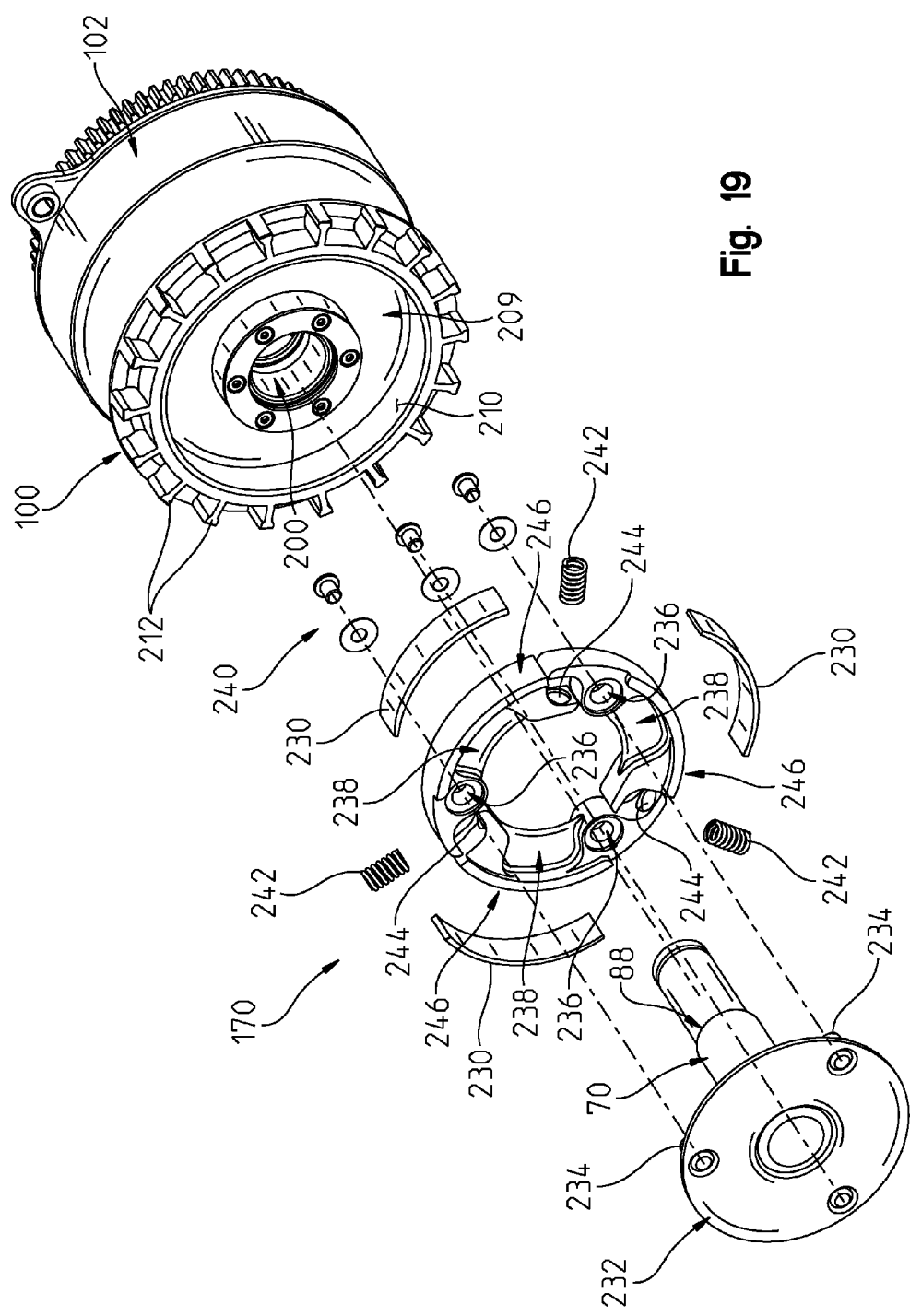
FIG. 19 is a partially exploded rear perspective view of the primary clutch and the launch clutch of FIG. 12.

As illustrated in FIGS. 18 and 19, a clutch assembly 170 is coupled to shaft 70 to serve as a starting or launch clutch for primary clutch 50. Clutch assembly 170 is illustratively a dry centrifugal clutch 170 integrated into primary clutch 50. Clutch assembly 170 is configured to be positioned external to the engine case 43 (see FIG. 2) of engine 42. As such, clutch assembly 170 is not integrated with the engine case 43 of engine 42 and is therefore not positioned in the engine oil. Rather, clutch assembly 170 is positioned outside of the engine case 43 and is coupled to the output shaft 44 of engine 42 to operate as a dry starting clutch for primary clutch 50. As such, clutch assembly 170 is removable from engine 42 by pulling the clutch assembly 170 from shaft 44.

In assembly, clutch assembly 170 is positioned in an interior 209 of primary clutch 50 (see FIG. 19). Clutch assembly 170 includes an end plate 232 coupled to shaft 70 and having a plurality of posts 234. In the illustrated embodiment, shaft 70 and end plate 232 are integrally formed, although shaft 70 may be coupled to end plate 232 using a fastener or press-fit configuration. As illustrated in FIG. 14, shaft 70 includes substantially cylindrical outer and inner surfaces 226, 228, respectively. Inner surface 228 forms a hollow interior region 229 of shaft 70. Outer and inner surfaces 226, 228 illustratively taper from end plate 232 towards end 71. The outer surface of shaft 70 further includes a step 88 such that the diameter of the portion of shaft 70 received by bushing assembly 172 and outer bearing support 184 is smaller than the diameter of the portion of shaft 70 positioned in tube portion 216 of sliding support 200. In the illustrated embodiment, the output shaft 44 of engine 42 (see FIG. 2) is received by interior region 229 of shaft 70 to drive rotation of clutch assembly 170. As such, clutch assembly 170 and shaft 70 rotate with engine 42.

Referring to FIGS. 18 and 19, clutch assembly 170 further includes shoes or arms 238 pivotally mounted to posts 234 via fasteners 240. Arms 238 each include an aperture 236 that receives a corresponding post 234 of end plate 232. Fasteners 240 illustratively include bolts and washers. Each arm 238 includes a friction pad 230 coupled to the outer circumferential surface of each arm 238. A spring 242 is coupled between adjacent arms 238 at seats 244 to bias arms 238 into spaced relation with each other.

In the illustrated embodiment, clutch assembly 170 is disengaged from primary clutch 50 when engine 42 (see FIG. 2) is at or below engine idle speed. As the engine speed and the corresponding rotational speed of clutch assembly 170 increases, the centrifugal force acting on arms 238 overcomes the biasing force of springs 242 and causes ends 246 of arms 238 to swing radially outward, thereby forcing friction pads 230 into engagement with an inner friction surface 210 (see FIG. 13) of stationary sheave 100. The engagement of clutch assembly 170 with stationary sheave 100 transfers torque to sliding support 200 and moveable sheave 102. As such, sheaves 100, 102, sliding support 200, and bushing assembly 172 all rotate with shaft 70. When the rotational speed of shaft 70 decreases to a threshold speed, the reduced centrifugal force causes arms 238 to move radially inward away from surface 210 of sheave 100. As such, clutch assembly 170 disengages primary clutch 50. Stationary sheave 100 illustratively includes a plurality of circumferentially spaced cooling fins 212 configured to reduce the heat generated by the engagement of clutch assembly 170.

In the illustrated embodiment, upon removing cover 61 and bracket 90 from mounting bracket 62 (see FIG. 5), a disengaged centrifugal starting clutch 170 allows primary clutch 50 to be pulled off shaft 70 as one assembled unit. Belt 54 (see FIG. 2) may be removed and/or replaced upon removing primary clutch 50 from shaft 70. Further, actuator assembly 80 (see FIGS. 9 and 10) remains coupled to mounting bracket 62 when primary clutch 50 is removed from shaft 70 such that the gears of actuator assembly 80 (e.g. reduction gear 130) are not required to be removed and reset or recalibrated. In one embodiment, primary clutch 50 and belt 54 are removable from shaft 70 without removing main gear drive 86 (see FIG. 5).

Centrifugal starting clutch 170 serves to separate the shifting function of primary clutch 50 from the engagement function of the primary clutch 50. In particular, the shifting function is performed by the primary clutch 50 via controller 36 (see FIG. 6), while the engagement of primary clutch 50 is controlled by starting clutch 170. As such, controller 36 is not required to control the engagement of primary clutch 50 because starting clutch 170 automatically engages primary clutch 50 upon reaching a predetermined rotational speed.

In an alternative embodiment, primary clutch 50 may be configured to operate without a starting clutch 170. For example, in this embodiment, primary clutch 50 of CVT 48 is directly coupled to the output of engine 42. When vehicle 10 is at idle or not running, controller 36 positions moveable sheave 102 away from stationary sheave 100 such that belt 54 is positioned radially inward towards shaft 70, as illustrated in FIG. 6. In one embodiment, controller 36 positions sheave 102 at a maximum open position when engine 42 is idling or not running such that moveable sheave 102 does not contact belt 54. In one embodiment, sheave 102 is disengaged from belt 54 during shifting of sub-transmission 56 (see FIG. 2). As such, secondary clutch 52 is rotating at a zero or minimal speed upon shifting sub-transmission 56. Engagement of sheave 102 and belt 54 is initiated upon engine driving torque being requested, e.g. upon throttle request by an operator. In another embodiment, sheave 102 is moved into engagement with belt 54 after sub-transmission 56 is shifted out of neutral and into gear. In another embodiment, moveable sheave 102 is spring-loaded away from belt 54 during engine idle, and the shifting of sub-transmission 56 into gear mechanically causes sheave 102 to move back into engagement with belt 54.

In one embodiment, controller 36 of FIG. 2 provides a spike load reduction feature configured to automatically shift CVT 48 upon detection of vehicle 10 being airborne. For example, when vehicle 10 of FIG. 1 is airborne, wheels 24 may accelerate rapidly due to the wheels 24 losing contact with the ground while the throttle operator 116 (see FIG. 2) is still engaged by the operator. When the wheels 24 again make contact with the ground upon vehicle 10 landing, the wheel speed decelerates abruptly, possibly leading to damaged or stressed components of the CVT 48 and other drive train components. Controller 36 initiates spike load control upon detection of vehicle 10 being airborne to slow drive train acceleration of the airborne vehicle 10. In one embodiment, controller 36 slows the rate at which CVT 48 upshifts during spike load control. In one embodiment, controller 36 stops upshifting of CVT 48 at least momentarily during spike load control or downshifts CVT 48 to a lower gear ratio. As such, the drive train acceleration of vehicle 10 is slowed before vehicle 10 returns to the ground, and the inertial loading on CVT 48 and other drive train components (e.g. sub-transmission 56, final drive 58, etc.) upon vehicle 10 landing is reduced or minimized. In one embodiment, controller 36 automatically adjusts the gear ratio of CVT 48 of the airborne vehicle 10 such that the wheel speed upon vehicle 10 returning to the ground is substantially the same as the detected wheel speed immediately prior to vehicle 10 becoming airborne.

In one embodiment, controller 36 determines that vehicle 10 is airborne upon detection of a sudden acceleration in drive train components. For example, controller 36 may detect the sudden acceleration based on feedback from a wheel speed sensor, engine speed sensor, transmission speed sensor, or other suitable speed sensor on the drive train of vehicle 10. In the illustrated embodiment, controller 36 continuously monitors the angular acceleration of the drive train by measuring the speed of one of the shafts of CVT 48 or sub-transmission 56 with a speed sensor 59. Vehicle 10 is determined to be airborne when the acceleration in wheel speed or drive train speed exceeds the design specifications of vehicle 10. For example, vehicle 10 has a maximum wheel acceleration based on available torque from engine 42, the frictional force from the ground, the weight of vehicle 10, and other design limits. When the monitored drive train components accelerate at a faster rate than vehicle 10 is capable under normal operating conditions (i.e., when wheels 24 are in contact with the ground), controller 36 determines that wheels 24 have lost contact with the ground. One or more predetermined acceleration limits are stored at controller 36 that correspond to the design limits of vehicle 10 to trigger the spike load control.

In one embodiment, the spike load reduction feature of controller 36 works in conjunction with a drive train protection feature that uses an electronic throttle control system to reduce drive train acceleration (i.e., by reducing the throttle opening, etc.) upon detection of an airborne condition, as described in U.S. patent application Ser. No. 13/153,037, filed on Jun. 3, 2011 and entitled "Electronic Throttle Control," the disclosure of which is incorporated herein by reference. In some operating conditions, a high or increasing throttle demand is provided with throttle operator 116 while vehicle 10 is airborne. In one embodiment, the engine 42 continues to rev due to the high throttle demand until a rev limit of the engine 42 is reached. In a vehicle 10 having electronic throttle control, airflow to the engine 42 is automatically restricted upon detection of the airborne condition to reduce engine power and to reduce the likelihood of reaching the rev limit.

Controller 36 may detect an airborne condition of vehicle 10 using other methods, such as by detecting the compression distance or height of a suspension system (e.g. front suspension assembly 26 of FIG. 1) of vehicle 10 with a suspension height sensor and/or by monitoring engine torque and power, as described in the referenced U.S. patent application Ser. No. 13/153,027.

In one embodiment, controller 36 provides a plurality of operating modes for CVT 48. Exemplary operating modes, illustratively selectable by an operator with operating mode selector 113, include performance, economy, manual mimic, cruise control, and hydrostatic modes. In one embodiment, the performance and economy modes are selectable for each of the manual mimic, cruise control, and hydrostatic modes. In one embodiment, the operating modes are only selectable when vehicle 10 is moving below a predetermined vehicle speed, such as below 10 mph, for example, although other suitable threshold speeds may be provided. In one embodiment, one or more of the operating modes are selectable only when vehicle 10 is substantially stopped.

The performance and economy modes are illustratively automatic modes wherein controller 36 actively controls CVT 48 based on engine speed, the position of throttle operator 116 and/or the throttle valve, and vehicle speed. In the economy mode, primary clutch 50 is adjusted based on engine speed according to a brake specific fuel consumption map stored at memory 39 of controller 36. In particular, CVT 48 and engine 42 cooperate to provide an improved fuel economy as compared with the performance mode. In a performance mode, primary clutch 50 is adjusted based on engine speed such that peak power is output for a given engine speed and/or other operating condition. As such, the performance mode provides improved vehicle performance as compared with the economy mode.

In the cruise control mode, at least one of the engine throttle position and the gear ratio of CVT 48 is held constant to hold the vehicle speed at a predetermined vehicle speed. In one embodiment, the throttle position of engine 42 is locked or held constant to hold the engine torque substantially constant, and the gear ratio of CVT 48 is varied based on vehicle speed feedback to maintain the target vehicle speed. In another embodiment, the gear ratio of CVT 48 is held constant during cruise control while the throttle position of engine 42 is varied to maintain the target vehicle speed. Alternatively, both the throttle position and the gear ratio of CVT 48 may be held substantially constant or may be simultaneously adjusted to control vehicle speed.

In the hydrostatic mode, the engine speed and the gear ratio of CVT 48 are controlled independently by an operator. For example, the engine speed is selected (e.g. with throttle operator 116 or another suitable input device) based on a particular use or application, i.e., for powering vehicle implements, for charging system capacity, etc. The gear ratio of CVT 48 is selected by a separate input device, such as a pedal lever, or joystick. In one embodiment, the hydrostatic mode is provided in a controller 36 that also includes electronic throttle control functionality, as described herein, or in a vehicle 10 that includes an engine speed governor.

In a manual mimic mode, controller 36 shifts CVT 48 between a plurality of discrete gear ratios to simulate a traditional manual or automatic transmission. In particular, primary clutch 50 is moved to a plurality of predetermined positions during operation that each correspond to a different gear ratio. For example, in a first gear, primary clutch 50 is moved to a first predetermined position providing a first gear ratio. When CVT 48 is shifted to a second gear, primary clutch 50 is moved to a second predetermined position providing a second gear ratio higher than the first gear ratio. Each predetermined position of primary clutch 50 corresponds to a different gear ratio.

In one embodiment, an operator inputs a shift command to controller 36 to initiate a gear shift in the manual mimic mode, further simulating operation of a traditional manual or semi-automatic transmission. For example, shift lever 29 (see FIG. 1) of vehicle 10 may be used for the selection of each discrete gear ratio by the operator. Other exemplary shifters include a switch, paddle, or knob. Alternatively, controller 36 shifts CVT 48 automatically between each predefined discrete gear ratio. In one embodiment, primary clutch 50 is moved to five or six predetermined positions across the displacement range of primary clutch 50 to provide five or six discrete gear ratios of CVT 48, although fewer or additional gear ratios may be provided. In one embodiment, ignition to engine 42 (FIG. 2) is momentarily cut as primary clutch 50 moves between each predetermined position. In particular, one or more spark plugs of engine 42 are cut during the transition between discrete gear ratios to simulate the inertia shift experienced in a vehicle 10 having a traditional manual or automatic transmission. Other torque interruption of engine 42 may be used to simulate traditional transmission shifting.

In one embodiment, CVT 48 further includes a planetary gear assembly to provide an infinitely variable transmission system. In one embodiment, the planetary gear assembly consists of a ring gear, several planetary gears coupled to a carrier, and a sun gear. The ring gear is driven directly off the output of engine 42 via a gear or chain. The planetary gears and the carrier are connected to and driven by the secondary clutch 52. The sun gear serves as the output of CVT 48 connected to the sub-transmission 56. Based on the gear ratios of the planetary gear assembly, the combined CVT 48 and planetary gear assembly are configured to provide both positive and negative speeds (forward and reverse) by varying the gear ratio of the CVT 48. In one embodiment, the hydrostatic mode provided with controller 36 and described herein is implemented in a CVT 48 having a planetary gear assembly.

Figure 20:
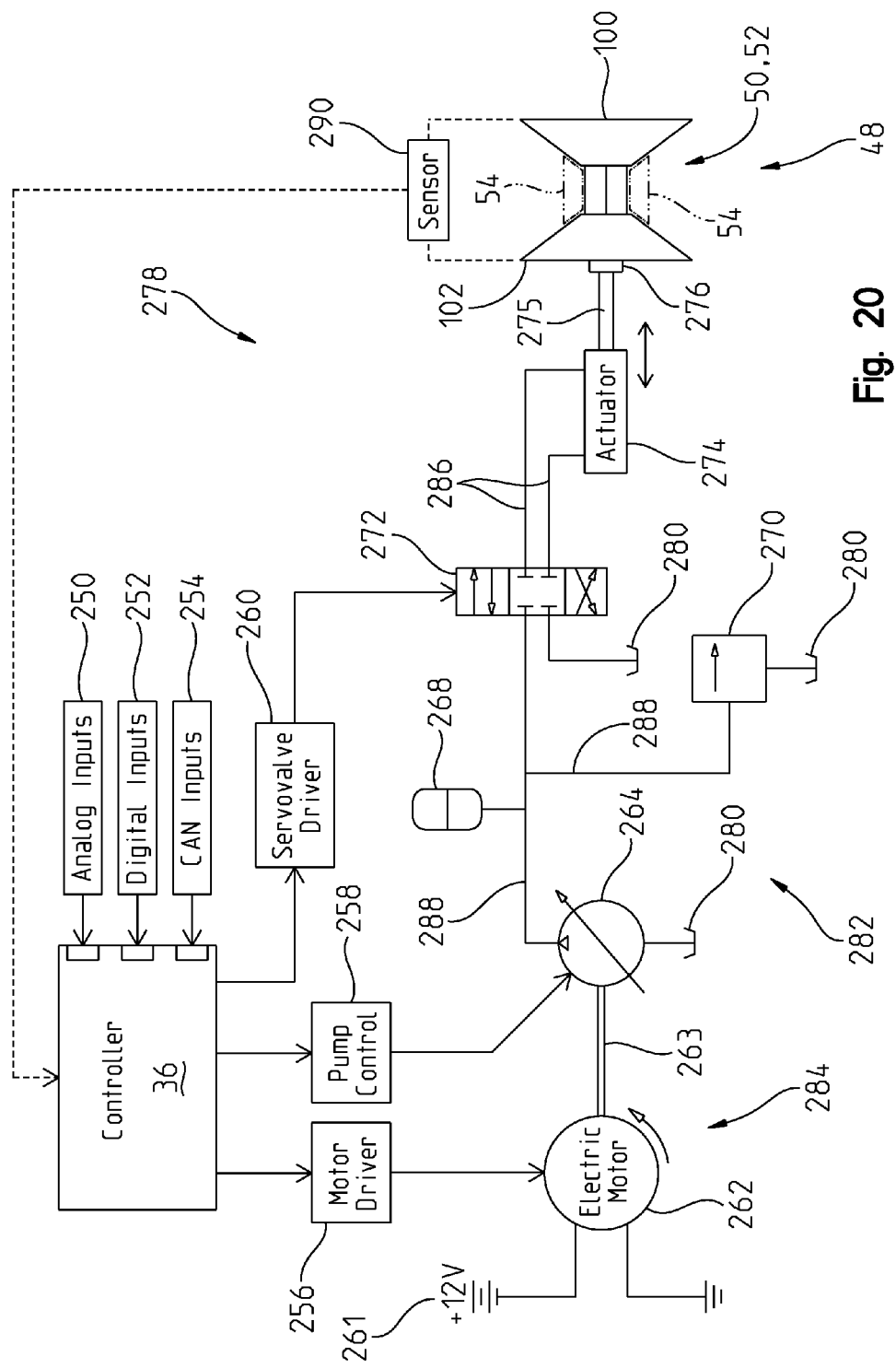
FIG. 20 is a diagrammatic view of an exemplary electrohydraulic circuit for controlling the CVT of FIG. 2 according to one embodiment.

In one embodiment, CVT 48 is electro-hydraulically actuated, as illustrated with the exemplary electro-hydraulic circuit 278 of FIG. 20. In the illustrated embodiment of FIG. 20, primary clutch 50 of CVT 48 is actuated by electro-hydraulic circuit 278 rather than by actuator assembly 80 of FIGS. 10 and 11. Circuit 278 may also be configured to control secondary clutch 52. Electro-hydraulic circuit 278 illustratively includes a hydraulic circuit 282 and an electric circuit 284. Controller 36 illustratively receives analog inputs 250, digital inputs 252, and CAN inputs 254. Exemplary analog and digital inputs 250, 252 include hydraulic system pressure sensors, a clutch position sensor (e.g. sensor 290 of FIG. 20), a servo valve position sensor, and other sensors detecting various parameters of vehicle 10. Exemplary CAN inputs 254 include an engine speed sensor, throttle position sensor, vehicle speed sensor, vehicle operating mode sensor, and other CAN based sensors that detect various parameters of vehicle 10. Controller 36 is configured to control an electric motor 262 of electric circuit 284 and a pump 264 and a servo valve 272 of hydraulic circuit 282 based on inputs 250, 252, 254.

A motor driver 256 is configured to control the power provided to motor 262 based on control signals from controller 36. Alternatively, a relay may be provided in place of motor driver 256 that is selectively actuated by controller 36 to provide fixed power to motor 262. Motor 262 may be any motor type suitable for driving pump 264. In the illustrated embodiment, motor 262 is a DC electric motor. A voltage supply 261, illustratively 12 VDC, is provided to motor 262, and the speed of motor 262 is controlled by controller 36 via motor driver 256. An output 263 of motor 262 drives pump 264. In the illustrated embodiment, pump 264 is a variable displacement pump 264. A pump control unit 258 of controller 36 modulates the displacement of pump 264 to control hydraulic pressure of hydraulic circuit 282 based on inputs 250, 252, 254. Pump 264 may alternatively be a fixed displacement pump.

A hydraulic accumulator 268 stores pressurized hydraulic fluid to assist pump 264 and motor 262 with meeting the pressure demands of hydraulic circuit 282. For example, accumulator 268 is configured to achieve required pressure demands of hydraulic circuit 282 during peak shift rates of CVT 48. As such, the likelihood of spike loads being induced on the electric circuit 284 during peak shift rates of CVT 48 is reduced. A pressure relief valve 270 is provided to maintain the pressure on hydraulic line 288 below a predetermined maximum threshold pressure. Pressure relief valve 270, pump 264, and servo valve 272 are coupled to a hydraulic return reservoir 280.

Servo valve 272 regulates the flow of hydraulic fluid from line 288 to actuator 274 to adjust the position of moveable sheave 102. Servo valve 272 is illustratively a three-way electro-hydraulic servo valve 272 controlled by a servo valve driver 260 of controller 36. Servo valve driver 260 of controller 36 controls servo valve 272 based on inputs 250, 252, 254. Actuator 274, illustratively a linear hydraulic actuator, includes a piston 275 coupled to moveable sheave 102 via a rotary bearing 276. In one embodiment, rotary bearing 276 is a flanged bearing or a face bearing, although another suitable bearing 276 may be provided. In one embodiment, actuator 274 is coupled to chassis 15 of vehicle 10 (see FIG. 1), and moveable sheave 102 rotates about piston 275 of actuator 274 and moves axially relative to actuator 274 via bearing 276. Servo valve 272 is coupled to actuator 274 via hydraulic lines 286. In one embodiment, lines 286 are small diameter, high pressure hydraulic lines 286. By regulating the fluid flow to actuator 274 with servo valve 272, linear displacement of actuator 274 is adjusted to cause corresponding axial adjustment of moveable sheave 102.

In one embodiment, electric circuit 284 and hydraulic circuit 282 are positioned on vehicle 10 (see FIG. 1) away from CVT 48, and actuator 274 is positioned immediately adjacent or within housing 60 (see FIG. 4) of CVT 48. As such, hydraulic lines 286 are routed from servo valve 272 to the actuator 274 positioned near CVT 48. For example, electric circuit 284 and hydraulic circuit 282 may be placed beneath hood 32 and/or seats 18a, 18b (see FIG. 1), and CVT 48 and actuator 274 may be positioned towards the rear end 14 of vehicle 10 beneath engine cover 19 (see FIG. 1). As such, the actuation components (i.e. actuator 274) of the moveable sheave(s) 102 of CVT 48 occupy a small space at the location of CVT 48 while some or all of the remaining components of electro-hydraulic circuit 278 are positioned elsewhere on vehicle 10.

In one embodiment, the pressure applied to moveable sheave 102 via actuator 274 is modulated to achieve a desired gear ratio of CVT 48 and/or a desired pinch force on belt 54. As illustrated in FIG. 20, a position sensor 290 is configured to detect the linear position of moveable sheave 102 and provide a corresponding signal to controller 36 with the detected position data. As such, the position of sheave 102 may be monitored during operation.

In one embodiment, controller 36 implements a fail-safe mode in the control of moveable sheave 102. In particular, when a system failure or signal loss is detected by controller 36, moveable sheave 102 is positioned to a maximum low ratio or open position such that the pinch force on belt 54 is minimized or removed. An exemplary system failure is when no or inadequate hydraulic pressure in hydraulic circuit 282 is detected with inputs 250, 252.

The electronically controlled clutch 50, 52 of CVT 48 is configured to move to a home position prior to or upon shutting down vehicle 10. For example, the controlled clutch 50, 52 moves to its fully open position (see FIG. 8, for example) or to its fully closed position (see FIG. 9, for example). In the illustrated embodiment, upon vehicle shutdown, moveable sheave 102 of primary clutch 50 moves to its furthest open position, as illustrated in FIG. 8. As such, moveable sheave 102 is positioned away from belt 54 prior to vehicle 10 being started, thereby reducing the likelihood of vehicle 10 taking off upon starting engine 42. In one embodiment, for an electronically controlled secondary clutch 52, the moveable sheave (not shown) of secondary clutch 52 moves to its furthest closed position.

Referring to FIG. 2, vehicle 10 includes a system battery 118 (e.g. 12 VDC) configured to provide power for starting vehicle 10 and to provide peripheral power to vehicle 10 during operation. The system battery 118 provides power to actuator assembly 80 to move moveable sheave 102 to the home position upon vehicle 10 being shutdown or being stopped and shifted into neutral. Primary clutch 50 of CVT 48 is also configured to return to a home position upon vehicle 10 suffering an abrupt power loss, as described herein with reference to FIGS. 21-23.

In another embodiment, vehicle 10 does not have a system battery 118. For example, vehicle 10 may include a mechanical rope and recoil assembly that is pulled by an operator to start engine 42. In particular, the pull of the rope by an operator rotates a power generator that starts engine 42 of vehicle 10, and the power generator (driven by the rotating engine 42) provides peripheral power to the electronic components of vehicle 10 during operation. See, for example, generator 304 of FIG. 22. As such, power from a system battery 118 is not available to move primary clutch 50 to its home position while vehicle 10 is shut down. In the illustrated embodiment, primary clutch 50 is moved to its home position prior to shutting down vehicle 10 using the power provided with generator 304, as described herein.

Figure 21:
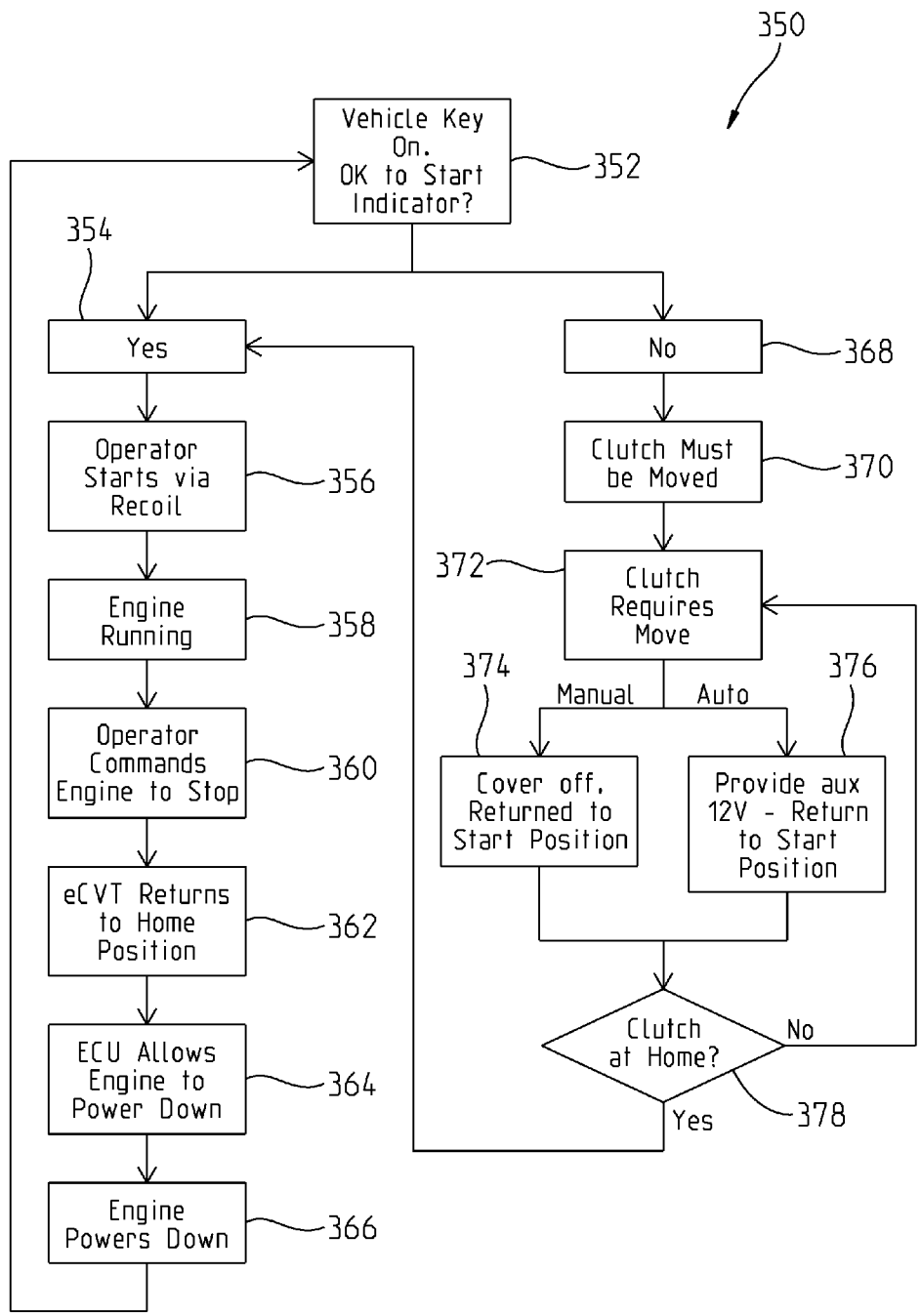
FIG. 21 is a block diagram illustrating an exemplary control strategy for moving a clutch of the CVT of FIG. 2 to a home position.

Referring to FIG. 21, an exemplary control strategy 350 is illustrated for moving primary clutch 50 to its home position in a vehicle 10 not having a system battery 118. Control strategy 350 is illustratively implemented by controller 36 of FIG. 2, although another control unit of vehicle 10 may be used. At block 352, an indicator (e.g. audible or visual) is provided on vehicle 10 upon moving the vehicle key to the ON position to indicate to the operator if primary clutch 50 is at its home position. In one embodiment, the indicator, such as a light, for example, is powered by a small, low-voltage battery. The indicator may alternatively be mechanically linked to the CVT 48 to detect the position of clutch 50. If primary clutch 50 is at its home position, engine 42 is started by the operator, as illustrated at blocks 354, 356, and 358. For example, an operator may start engine 42 via a manual start system, such as a rope/recoil assembly or kick start assembly. In one embodiment, actuation of the manual start system is blocked when primary clutch 50 is not at its home position at block 352.

Upon an operator commanding engine 42 to stop at block 360 (e.g. turning the vehicle key to OFF), primary clutch 50 automatically returns to its home position at block 362 prior to controller 36 allowing engine 42 to power down. In particular, controller 36 executes a shut down sequence at block 362 wherein controller 36 retains engine power despite the operator commanding shutdown, moves sheave 102 of primary clutch 50 to its home position (i.e., with actuator assembly 80), and then allows engine 42 to shut down (block 364). At block 366, engine 42 shuts down. Accordingly, primary clutch 50 is at the home position before engine 42 shuts down such that vehicle 10 may be properly started up again at a future time without having to reset clutch 50.

If primary clutch 50 is not at its home position at block 352, primary clutch 50 must be moved to its home position prior to starting vehicle 10, as illustrated at blocks 368, 370, and 372. For example, clutch 50 may require a reset when vehicle 10 abruptly loses power before controller 36 is able to reset clutch 50 to its home position. Primary clutch 50 may be reset manually or automatically. In the manual reset of block 374, an operator removes cover 61 (see FIG. 5) of CVT 48 and manually resets moveable sheave 102 to its home position by turning outer screw assembly 120 (see FIG. 5). In the automatic reset of block 376, vehicle 10 includes an auxiliary power connection 330 (see FIG. 22) for connecting vehicle 10 to an external power supply (e.g. 12 VDC). The external power supplied through auxiliary power connection 330 is routed to controller 36. Upon detecting the presence of external power, controller 36 moves primary clutch 50 to its home position via actuator assembly 80. In one embodiment, power provided through auxiliary power connection 330 is routed directly to motor 76 of actuator assembly 80 (see FIG. 2), and an operator manually controls actuator assembly 80 with a switch or a diagnostic tool to move primary clutch 50 to the home position. At block 378, if primary clutch 50 is at the home position, the operator is able to start engine 42 at blocks 354 and 356. If primary clutch 50 is not at the home position at block 378, the process returns to block 372 for additional manual or automatic movement of clutch 50.

Figure 22:
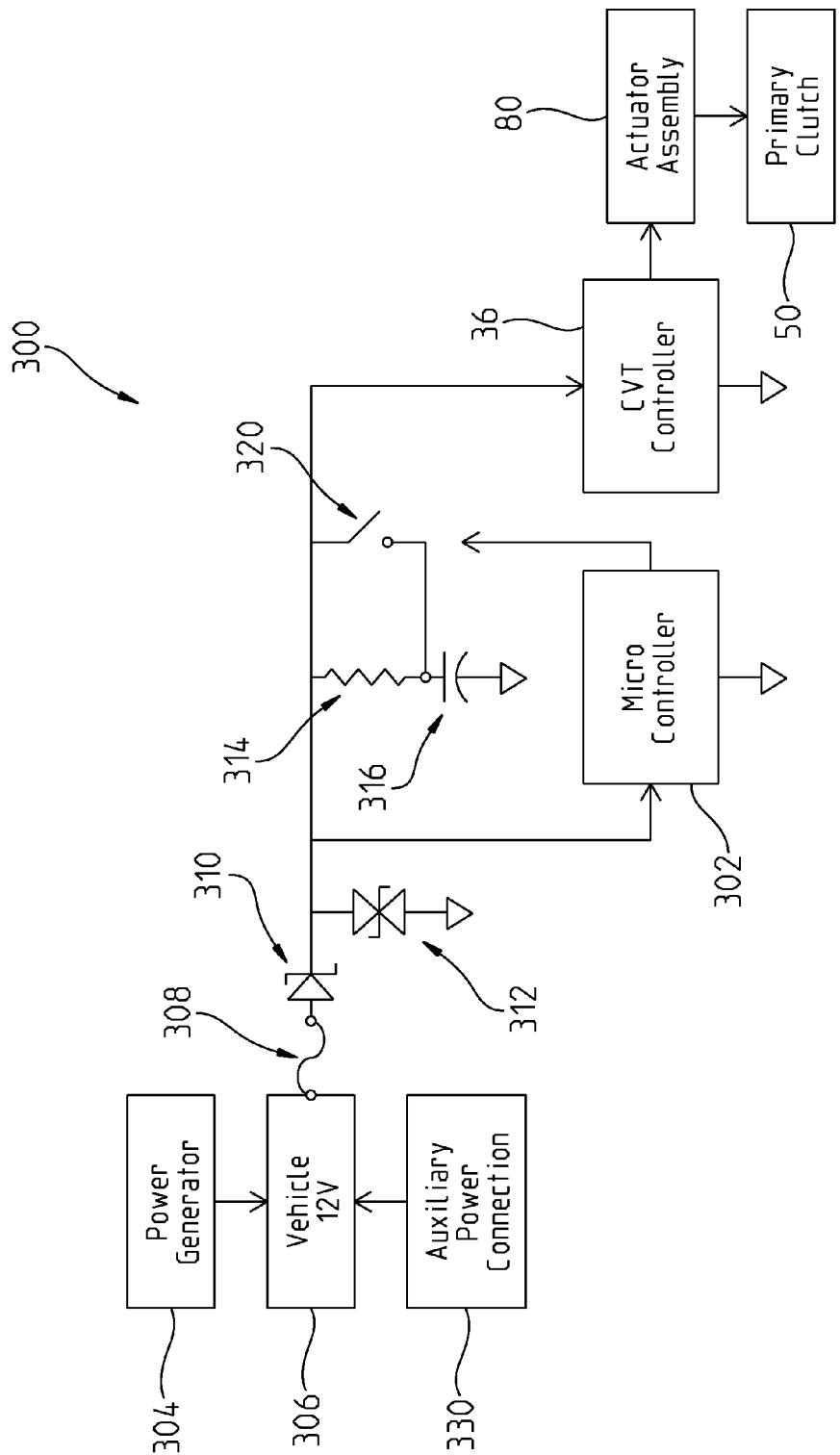
FIG. 22 is a diagrammatic view of an exemplary control system of the vehicle of FIG. 1 without a system battery.

Referring to FIG. 22, an exemplary control system 300 for a vehicle 10 without a system battery 318 (FIG. 2) is illustrated. Control system 300 illustratively includes a microcontroller 302 that controls a switch 320 to selectively route power stored at a capacitor 316 to controller 36. Microcontroller 302 includes a processor and a memory accessible by the processor and containing software with instructions for monitoring vehicle power 306, detecting power interruption, and controlling switch 320. Microcontroller 302 and controller 36 may alternatively be integrated in a single controller. Generator 304, driven by engine 42 (FIG. 2), provides vehicle power 306 (illustratively 12 VDC) for controller 36, microcontroller 306, and other peripheral components and for charging capacitor 316. Capacitor 316 may alternatively be charged by an external power supply via auxiliary connection 330. A fuse 308 and a diode 310, illustratively a Zener diode 310, are provided in series between vehicle 306 and controllers 302, 36 to provide reverse voltage protection. A diode 312, illustratively a transient voltage suppression diode 312, is coupled between the output of diode 310 and ground to provide over-voltage protection for controllers 302, 36. A resistor 314 is provided for charging capacitor 316.

Microcontroller 302 is configured to close switch 320 upon detection of a power loss at vehicle power 306. For example, upon vehicle 10 abruptly losing power, microcontroller 302 senses the drop in vehicle power 306 and closes switch 320. As a result, power stored at capacitor 316 is routed to controller 36 for moving primary clutch of CVT 48 to the home position. In one embodiment, capacitor 316 is an ultra-capacitor. Capacitor 316 is alternatively a lithium ion battery or another lightweight battery that is smaller than a typical vehicle system battery 318 (FIG. 2).

Figure 23:
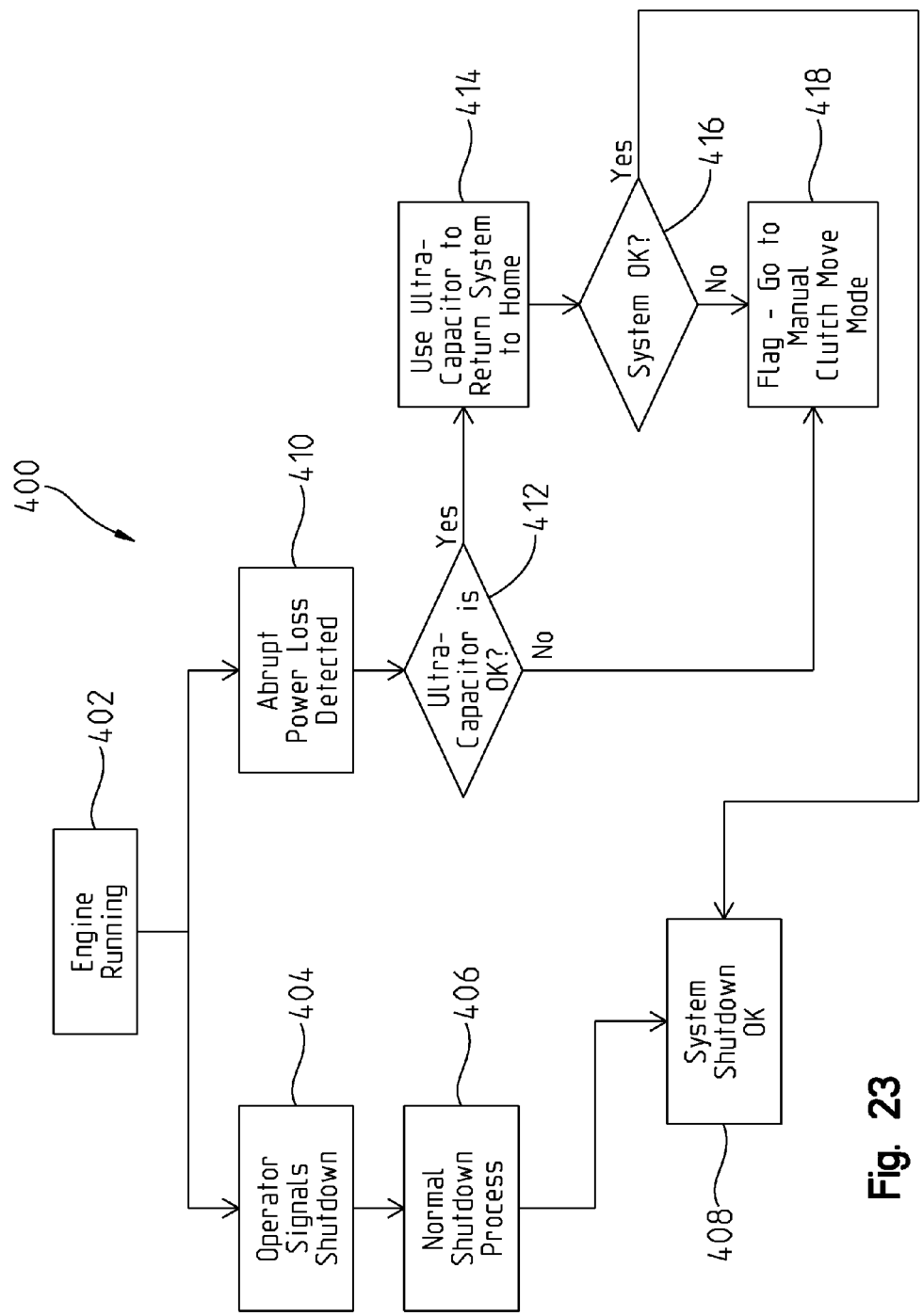
FIG. 23 is a block diagram illustrating an exemplary control strategy of the control system of FIG. 22 for moving a clutch of the CVT of FIG. 2 to a home position.

Referring to FIG. 23, an exemplary control strategy 400 is illustrated for control system 300 of FIG. 22. With engine running at block 402, an operator signals a vehicle shutdown at block 404, and the normal shutdown process for vehicle 10 is performed at block 406. For example, the shutdown process illustrated in blocks 360, 362, 364, and 366 of FIG. 21 and described herein is performed at block 406 of FIG. 23. If an abrupt power loss is detected by controller 302 (FIG. 22) at block 410, controller 302 determines if capacitor 412 is charged and functioning properly. If controller 302 determines capacitor 316 is not functioning properly, switch 320 is not closed and primary clutch 50 is manually moved to its home position at block 418, as described with block 374 of FIG. 21. If capacitor 316 is functioning properly at block 412, microcontroller 302 closes switch 320 to route power to controller 36 at block 414. Controller 36 uses the power from capacitor 316 to drive actuator assembly 80 to move primary clutch 50 of CVT 48 to its home position. At block 416, controller 36 (or microcontroller 302) determines if clutch 50 is at its home position based on feedback from a position sensor (e.g. sensor 290 of FIG. 20). If clutch 50 is at its home position, the shutdown of vehicle 10 is determined to be proper at block 408. If clutch 50 is not at its home position at block 416, process 400 proceeds to block 418 for a manual reset of clutch 50, as described herein. In one embodiment, capacitor 316 is sized to contain enough energy for moving clutch 50 to its home position based on a worst set of initial operating conditions where power interruptions could occur.

In one embodiment, vehicle 10 includes a mechanical return system for automatically positioning primary clutch 50 at the home position upon system power being removed. For example, a mechanical spring/linkage system is coupled to moveable sheave 102 (see FIG. 5) of primary clutch 50 to position primary clutch 50 in its home position upon vehicle 10 being powered down. When power is returned to vehicle 10, controller 36 operates normally to control primary clutch 50, as described herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A continuously variable transmission including:
   a shaft; and
   a clutch having a first sheave and a second sheave each supported by the shaft, the clutch further including a sliding assembly and a screw assembly, the screw assembly and the sliding assembly being configured to cooperate to move the second sheave relative to the first sheave along the shaft, the sliding assembly including a bearing configured to move with the second sheave along the shaft, the screw assembly including a screw portion, the second sheave and the screw portion each having an outer profile, at least a portion of the bearing being positioned outside of the outer profile of the second sheave and at least a portion of the bearing being positioned inside the outer profile of the screw portion.

2. The transmission of claim 1, wherein the bearing is an angular contact bearing.

3. The transmission of claim 1, wherein rotation of the screw assembly causes axial movement of the second sheave relative to the first sheave.

4. The transmission of claim 3, wherein the sliding assembly includes a bushing assembly coupled to the shaft, and the bearing is positioned between the bushing assembly and the screw portion of the screw assembly.

5. A continuously variable transmission including:
   a shaft; and
   a clutch having a first sheave and a second sheave each supported by the shaft, the second sheave having an outer profile and being configured to move relative to the first sheave along the shaft, the clutch including a screw assembly having a screw portion, the screw assembly being configured to move the second sheave axially along the shaft, the clutch further including a bushing assembly and a bearing configured to move with the second sheave, at least a portion of the screw portion of the screw assembly being axially between the second sheave and the bearing.

6. The transmission of claim 5, wherein the bearing is positioned between the screw portion of the screw assembly and the bushing assembly, and a rotation of the screw assembly causes axial movement of the bushing assembly and the second sheave relative to the first sheave.

7. The transmission of claim 5, the bushing assembly including a neck portion configured to engage the bearing, the neck portion of the bushing assembly being positioned outside of the outer profile of the second sheave.

8. The transmission of claim 7, the bushing assembly further including a shoulder portion adjacent the neck portion and a plurality of flanges extending from the shoulder portion and being coupled to the second sheave, the bearing being positioned adjacent the neck portion and the shoulder portion of the bushing assembly.

9. The transmission of claim 5, wherein the clutch further includes a sliding assembly that cooperates with the screw assembly to move the second sheave along the shaft, the sliding assembly includes a plate portion, and the bushing assembly is coupled to the plate portion.

10. The transmission of claim 9, further including a second clutch and a belt coupled between the clutch and the second clutch, wherein the sliding assembly of the clutch further includes a tube portion positioned between the shaft and the second sheave, and wherein the belt moves between a first position adjacent the tube portion and a second position away from the tube portion during movement of the second sheave along the shaft.

11. The transmission of claim 1, wherein the bearing is positioned between the screw portion and the shaft.

12. The transmission of claim 1, further including a second clutch and a belt coupled between the clutch and the second clutch, wherein the second sheave of the clutch contacts the belt throughout the entire range of axial motion of the second sheave along the shaft.

13. The transmission of claim 1, further including a second clutch and a belt coupled between the clutch and the second clutch, the sliding assembly of the clutch including a tube portion positioned between the shaft and the second sheave, the belt moving between a first position adjacent the tube portion and a second position away from the tube portion during movement of the second sheave along the shaft.

14. A continuously variable transmission including:
   a shaft; and
   a clutch having a first sheave and a second sheave each coupled to the shaft, the second sheave having an inner diameter near the shaft and an outer diameter, the clutch further including a sliding assembly coupled to the shaft and to the second sheave, the sliding assembly and the second sheave cooperating to form a sliding interface near the outer diameter of the second sheave, the sliding assembly being configured to transmit a rotational force to the second sheave at the sliding interface to rotate the second sheave.

15. The transmission of claim 14, wherein the second sheave includes a plurality of ridges and the sliding interface includes a plurality of clips configured to engage the plurality of ridges to form the sliding interface.

16. The transmission of claim 14, wherein the sliding assembly and the second sheave cooperate to form a plurality of sliding interfaces circumferentially spaced near the outer diameter of the second sheave, the rotational force being transmitted to the second sheave at the plurality of sliding interfaces.

17. The transmission of claim 14, wherein the sliding assembly includes a plate portion that cooperates with the second sheave to form the sliding interface, and the plate portion is fixed axially relative to the shaft and the second sheave is moveable axially relative to the plate portion and to the shaft.

18. The transmission of claim 17, wherein the plate portion transmits the rotational force from the shaft to the second sheave at the sliding interface.

19. The transmission of claim 14, wherein the second sheave includes a plurality of radially extending projections near the outer diameter, and the sliding assembly engages the plurality of radially extending projections to form a plurality of sliding interfaces.

20. The transmission of claim 14, wherein the clutch includes a screw assembly configured to actuate axial movement of the second sheave along the sliding interface.

21. The transmission of claim 14, wherein the sliding interface includes a radially extending wall.

22. A continuously variable transmission including:
   a first clutch including a first sheave and a second sheave moveable relative to the first sheave, the first clutch having an axis of rotation;

a second clutch;

a belt coupled between the first and second clutches; and an actuator configured to move the second sheave of the first clutch relative to the first sheave of the first clutch, the actuator being positioned between the first clutch and the second clutch and in a plane intersecting the first clutch and the second clutch, the plane being normal to the axis of rotation of the first clutch.

23. The transmission of claim 22, wherein the first clutch has an outer profile, and the actuator is positioned completely outside the outer profile of the first clutch.

24. The transmission of claim 22, wherein the actuator includes a motor, a reduction gear, and a gear shaft, the gear shaft being positioned between the first clutch and the second clutch and in the plane intersecting the first clutch and the second clutch.

25. The transmission of claim 24, wherein the continuously variable transmission further includes a housing, the first and second clutches are positioned in the housing, and at least a portion of the motor and at least a portion of the reduction gear are positioned outside of the housing.

26. The vehicle of claim 22, wherein the second clutch includes a first sheave and a second sheave, the second sheave of the second clutch is moveable relative to the first sheave of the second clutch, and the plane intersects the actuator, at least one of the first and second sheaves of the first clutch, and at least one of the first and second sheaves of the second clutch.

27. The vehicle of claim 26, further including a housing, the first and second clutches being positioned in the housing, the actuator including a motor and a gear shaft driven by the motor, the gear shaft being positioned between the at least one of the first and second sheaves of the first clutch and the at least one of the first and second sheaves of the second clutch, and the motor being positioned outside the housing.

28. The vehicle of claim 22, wherein the belt forms a loop around the first and second clutches, and the actuator extends through the loop formed by the belt.

29. A recreational vehicle including:

a chassis;

a ground engaging mechanism configured to support the chassis;

an engine supported by the chassis;

a continuously variable transmission driven by the engine, the continuously variable transmission including a first clutch and a second clutch, the first clutch being adjustable to modulate a gear ratio of the continuously variable transmission; and an electro-hydraulic circuit configured to control the first clutch, the electro-hydraulic circuit including a motor, a hydraulic pump driven by the motor, and an actuator driven by the hydraulic pump and configured to adjust the first clutch, the actuator being coupled adjacent the continuously variable transmission and at least one of the motor and the hydraulic pump being positioned away from the continuously variable transmission.

30. The vehicle of claim 29, wherein the actuator and the continuously variable transmission are positioned at a first end of the vehicle, and the at least one of the motor and the hydraulic pump is positioned at a second end of the vehicle opposite the first end or at a middle portion of the vehicle between the first and second ends.

31. The vehicle of claim 30, wherein the first end is the rear end of the vehicle and the second end is the front end of the vehicle, the first end includes an engine cover, and the engine, the continuously variable transmission, and the actuator are positioned beneath the engine cover.

32. The vehicle of claim 29, further including an cab portion supported by the chassis and having side by side seating, wherein the at least one of the motor and the hydraulic pump are positioned beneath the side by side seating.

33. A vehicle including:

a chassis;

a ground engaging mechanism configured to support the chassis;

an engine supported by the chassis and having an output;

a continuously variable transmission driven by the engine, the continuously variable transmission including a first clutch driven by the engine, a second clutch driven by the first clutch, and a belt coupled between the first and second clutches, the first clutch having an interior region, the first clutch being adjustable to modulate a gear ratio of the continuously variable transmission; and a centrifugal starting clutch coupled to the output of the engine and positioned in the interior region of the first clutch, the centrifugal starting clutch being configured to engage the first clutch upon a speed of the engine reaching a threshold speed.

34. The vehicle of claim 33, wherein the engine includes an engine case and an output shaft extending outside the engine case, and the centrifugal starting clutch is coupled to the output shaft and is positioned entirely external to the engine case.

35. The vehicle of claim 33, wherein the continuously variable transmission includes a housing having a plurality of walls and an opening in at least one of the plurality of walls, the first and second clutches and the centrifugal starting clutch are positioned in the housing, and the output of the engine extends through the opening of the at least one wall and into the housing.

36. The vehicle of claim 33, wherein the first clutch includes an inner wall forming the interior region, and the centrifugal starting clutch contacts the inner wall of the first clutch to engage the first clutch upon the speed of the engine reaching the threshold speed.

37. The vehicle of claim 36, wherein the first clutch includes a first sheave axially fixed and a second sheave axially moveable relative to the first sheave, and the first sheave includes the inner wall that forms the interior region for receiving the centrifugal starting clutch.

38. The vehicle of claim 33, wherein the first clutch further includes a first sheave, a second sheave, and a shaft supporting the first and second sheaves, and the centrifugal starting clutch is coupled to the shaft of the first clutch.

39. The vehicle of claim 38, wherein the output of the engine includes an output shaft that is received by the shaft of the first clutch.

* * * * *